United States Patent
Wu et al.

(10) Patent No.: US 9,843,366 B1
(45) Date of Patent: Dec. 12, 2017

(54) METHOD FOR TRANSMITTING 4-ANTENNA PRECODING MATRIX, USER EQUIPMENT AND BASE STATION

(71) Applicant: Huawei Technologies Co., Ltd., Shenzhen (CN)

(72) Inventors: Qiang Wu, Beijing (CN); Leiming Zhang, Beijing (CN); Jianghua Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/371,840

(22) Filed: Dec. 7, 2016

Related U.S. Application Data

(63) Continuation of application No. 14/960,100, filed on Dec. 4, 2015, now Pat. No. 9,531,460, which is a (Continued)

(51) Int. Cl.
*H04B 7/02* (2017.01)
*H04L 1/02* (2006.01)
(Continued)

(52) U.S. Cl.
CPC ......... *H04B 7/0456* (2013.01); *H04B 7/0417* (2013.01); *H04B 7/0639* (2013.01); *H04L 1/06* (2013.01)

(58) Field of Classification Search
CPC .. H04B 7/0639; H04B 7/0417; H04B 7/0456; H04B 7/0626; H04B 7/063; H04B 7/0478; H04B 7/0632; H04B 7/0658; H04L 25/03898; H04L 1/0029; H04L 1/0036; H04L 25/0242; H04L 27/2626
See application file for complete search history.

(56) References Cited

U.S. PATENT DOCUMENTS

| 8,483,306 B2 | 7/2013 | Chen et al. |
| 8,509,710 B2 | 8/2013 | Kim et al. |

(Continued)

FOREIGN PATENT DOCUMENTS

| CN | 101594208 A | 12/2009 |
| CN | 101924611 A | 12/2010 |

(Continued)

OTHER PUBLICATIONS

3rd Generation Partnership Project; Technical Specification Group Radio Access Network; Evolved Universal Terrestrial Radio Access (E-UTRA); Physical Layer Procedures (Release 11), 3GPP TS 36.213 V11.2.0 (Feb. 2013), 173 pages.
(Continued)

*Primary Examiner* — Daniel Washburn
*Assistant Examiner* — Amneet Singh
(74) *Attorney, Agent, or Firm* — Slater Matsil, LLP

(57) ABSTRACT

Embodiments disclose a method for transmitting a 4-antenna precoding matrix, a user equipment, and a base station. The method includes determining a rank used for indicating the number of transmission layers, determining a first precoding matrix in a codebook set corresponding to the rank, determining a first PMI and a second PMI used for indicating the first precoding matrix, and sending the first PMI and the second PMI used for indicating the first precoding matrix to a base station.

20 Claims, 9 Drawing Sheets

Related U.S. Application Data continuation of application No. PCT/CN2013/076735, filed on Jun. 4, 2013.

(51) Int. Cl.
*H04B 7/0456* (2017.01)
*H04L 1/06* (2006.01)
*H04B 7/0417* (2017.01)
*H04B 7/06* (2006.01)

(56) References Cited

U.S. PATENT DOCUMENTS

| | | | |
|---|---|---|---|
| 9,407,346 | B2 | 8/2016 | Chen et al. |
| 9,456,318 | B2 | 9/2016 | Zhang et al. |
| 2009/0046569 | A1 | 2/2009 | Chen et al. |
| 2009/0122857 | A1 | 5/2009 | Li et al. |
| 2010/0166094 | A1 | 7/2010 | Lee et al. |
| 2012/0106470 | A1 | 5/2012 | Clerckx et al. |
| 2012/0201207 | A1 | 8/2012 | Liu |
| 2012/0213310 | A1 | 8/2012 | Ko et al. |
| 2012/0328039 | A1 | 12/2012 | Mazzarese et al. |
| 2013/0058386 | A1* | 3/2013 | Mazzarese ............ H04B 7/063 375/219 |
| 2013/0064276 | A1 | 3/2013 | Kim et al. |
| 2013/0077704 | A1 | 3/2013 | Ding et al. |
| 2013/0136203 | A1 | 5/2013 | Chen et al. |
| 2013/0170578 | A1 | 7/2013 | Wu et al. |
| 2013/0243108 | A1 | 9/2013 | Chen et al. |
| 2014/0192918 | A1 | 7/2014 | Park et al. |
| 2014/0301492 | A1 | 10/2014 | Xin et al. |
| 2015/0381253 | A1 | 12/2015 | Kim et al. |

FOREIGN PATENT DOCUMENTS

| | | |
|---|---|---|
| CN | 101931512 A | 12/2010 |
| CN | 102013953 A | 4/2011 |
| CN | 102938687 A | 2/2013 |
| EP | 2015503 A2 | 1/2009 |
| EP | 2555444 A2 | 2/2013 |
| JP | 2016517192 A | 6/2016 |
| RU | 2434328 C2 | 3/2011 |
| RU | 2475982 C1 | 2/2013 |
| WO | 2012093742 A1 | 7/2012 |

OTHER PUBLICATIONS

Alcatel-Lucent, et. al., "Introduction of Rel 12 Feature for Downlink MIMO Enhancement," Draft Change Request, 3GPP TSG-RAN WG1 Meeting #73, Fukuoka, Japan, May 20-24, 2013, 39 pages.

Alcatel-Lucent, "Way Forward of 4Tx Rank 1 and 2 Codebook Design for Downlink MIMO Enhancement in Rel-12," 3GPP TSG RAN WG1 #73, R1-132738, Fukuoka, Japan, May 20-24, 2013, 9 pages.

Alcatel-Lucent, et al., "Proposals of Enhanced 4Tx Codebook and Codebook Subsampling," 3GPP TSG RAN WG1 Meeting #73, R1-132840, Fukuoka, Japan, May 20-24, 2013, 6 pages.

Huawei, et al., "Evaluations of 4Tx Codebook Option 2a and 2b," 3GPP TSG RAN WG1 Meeting #73, R1-132832, Fukuoka, Japan, May 20-24, 2013, 6 pages.

Huawei, et al., "Details of 4Tx Codebook Subsampling," 3GPP TSG RAN WG1 Meeting #73, R1-132833, Fukuoka, Japan, May 20-24, 2013, 4 pages.

LG Electronics, "Considerations on 4tx Codebook for DL MIMO Enhancement," 3GPP TSG RAN WG1 Meeting #72bis, R1-131287, Chicago, IL, USA, Apr. 15-19, 2013, 5 pages.

Fujitsu, "Consideration Regarding Additional Information for New Aperiodic PUSCH Feedback Mode," 3GPP TSG RAN WG1 Meeting #73, R1-131928, Fukuoka, Japan, May 20-24, 2013, 6 pages.

\* cited by examiner

METHOD FOR TRANSMITTING 4-ANTENNA PRECODING MATRIX, USER EQUIPMENT AND BASE STATION

CROSS-REFERENCE TO RELATED APPLICATIONS

This application is a continuation of U.S. application Ser. No. 14/960,100, filed on Dec. 4, 2015, which is a continuation of International Application No. PCT/CN2013/076735, filed on Jun. 4, 2013. The disclosures of the aforementioned applications are hereby incorporated by reference in their entireties.

TECHNICAL FIELD

The present invention relates to the communications field, and in particular, to a method for transmitting a 4-antenna precoding matrix, a user equipment and a base station in the communications field.

BACKGROUND

A multiple input multiple output ("MIMO" for short) radio system is capable of obtaining diversity and an array gain by means of transmit beamforming ("BF" for short)/precoding and receive signal combination. A signal vector received by a typical system that uses BF or precoding may be represented by the following equation (1):

$$y = HVs + n \qquad (1)$$

where y represents the received signal vector, H represents a channel matrix, V represents a precoding matrix, s represents a transmitted symbol vector, and n represents measured noise.

Optimal precoding generally requires that a transmitter completely known channel state information ("CSI" for short). A common method is that a user equipment ("UE" for short) quantizes instantaneous CSI and feeds back the CSI to an evolved NodeB ("eNB" for short). In the release 8 (R8) of an existing Long Term Evolution ("LTE" for short) system, CSI information fed back by the UE may include information such as a rank indicator ("RI" for short), a precoding matrix indicator ("PMI" for short), and a channel quality indicator ("CQI" for short), where the RI and the PMI respectively indicate the number of layers and a precoding matrix that are used. A codebook of the LTE R8 is designed mainly for single user MIMO ("SU-MIMO" for short), where a precoding matrix or a code word needs to satisfy an 8 phase shift keying ("8PSK" for short) restraint, which limits precision of space quantization. This causes a serious limitation to performance of a transmission manner that is sensitive to space quantization precision, such as multi-user MIMO ("MU-MIMO" for short).

In order to satisfy a higher system requirement, a 3rd Generation Partnership Project ("3GPP" for short) LTE system needs to further enhance performance of MU-MIMO; moreover, a coordinated multi-point ("CoMP" for short) transmission technology is further introduced into the system. At present, the CoMP technology is based on single-cell feedback; therefore, both the foregoing two technologies raise higher requirements on feedback performance. Because a capacity of a feedback channel is limited, a size of a codebook set is also limited, which raises higher requirements on codebook designing.

A 3GPP LTE R8 system uses a single codebook, where a precoding matrix is indicated by an RI and a PMI. With respect to a 4-antenna system, correspondences between RIs, PMIs, and code words in a codebook are shown in the following Table 1:

TABLE 1

| PMI | $u_n$ | RI=1 | RI=2 | RI=3 | RI=4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, I is a 4×4 identity matrix, and $u_n$ is given in the foregoing Table 1.

In the codebook of the R8 system, with respect to a precoding matrix whose rank is 1, precoding matrices whose indexes are 0 to 7 are discrete Fourier transform ("DFT" for short) vectors, where the DFT vectors are applicable to a uniform linear array ("ULA" for short) antenna. A DFT vector indicates a T×1 precoding matrix, and the DFT vector v generally has a form shown in equation (2):

$$v = [1\ e^{j2\pi m/N}\ \ldots\ e^{j2\pi(T-2)m/N}\ e^{j2\pi(T-1)m/N}] \qquad (2),$$

where N and m are integers, $N = 2^x$, where x is a nonnegative integer, that is, N is 2 raised to the power of x, and a $t^{th}$ element of the DFT vector v is $e^{j2\pi(t-1)m/N}$ (t=1, 2, ..., T).

In a release 10 (R10) of the 3GPP LTE system, a codebook used by an 8-antenna system is formed by two groups of DFT vectors $v_m$, and the two groups of DFT vectors have a phase difference $\phi_n$, where the DFT vectors $v_m$ and the phase difference are represented by the following equation (3):

$$v_m = [1\ e^{j2\pi m/32}\ e^{j4\pi m/32}\ e^{j6\pi m/32}]^T,\ \phi_n = e^{j\pi n/2} \qquad (3)$$

The following provides a codebook structure of the 8-antenna system. The codebook structure is designed for a dual-polarized antenna. Table 2 shows an 8-antenna codebook when a rank is 1 (that is, the number of transmission layers is one layer), Table 3 shows the 8-antenna codebook when the rank is 2 (that is, the number of transmission layers is two layers), Table 4 shows the 8-antenna codebook when the rank is 3 (that is, the number of transmission layers is three layers), and Table 5 shows the 8-antenna codebook when the rank is 4 (that is, the number of transmission layers is four layers).

TABLE 2

| $i_1$ | $i_2$ | | | | | | | |
|---|---|---|---|---|---|---|---|---|
| | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where, $$W^{(1)}_{m,n} = \frac{1}{\sqrt{8}}\begin{bmatrix} v_m \\ \varphi_n v_m \end{bmatrix}$$

TABLE 3

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |

| $i_1$ | $i_2$ | | | |
|---|---|---|---|---|
| | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| $i_1$ | $i_2$ | | | |
|---|---|---|---|---|
| | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| $i_1$ | $i_2$ | | | |
|---|---|---|---|---|
| | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where, $$W^{(2)}_{m,m',n} = \frac{1}{4}\begin{bmatrix} v_m & v_{m'} \\ \varphi_n v_m & -\varphi_n v_{m'} \end{bmatrix}$$

TABLE 4

| $i_1$ | $i_2$ | | |
|---|---|---|---|
| | 0 | 1 | 2 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1,8i_1+8}$ |

| $i_1$ | $i_2$ | | |
|---|---|---|---|
| | 3 | 4 | 5 |
| 0-3 | $\tilde{W}^{(3)}_{8i_1+8,8i_1,8i_1}$ | $W^{(3)}_{8i_1+2,8i_1+2,8i_1+10}$ | $W^{(3)}_{8i_1+10,8i_1+2,8i_1+10}$ |

TABLE 4-continued

| $i_1$ | $i_2$ | | |
|---|---|---|---|
| | 6 | 7 | 8 |
| 0-3 | $\tilde{W}^{(3)}_{8i_1+2,8i_1+10,8i_1+10}$ | $\tilde{W}^{(3)}_{8i_1+10,8i_1+2,8i_1+2}$ | $W^{(3)}_{8i_1+4,8i_1+4,8i_1+12}$ |

| $i_1$ | $i_2$ | | |
|---|---|---|---|
| | 9 | 10 | 11 |
| 0-3 | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

TABLE 4-continued

| $i_1$ | $i_2$ | | |
|---|---|---|---|
| | 12 | 13 | 14 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ |

| $i_1$ | $i_2$ |
|---|---|
| | 15 |
| 0-3 | $\tilde{W}^{(3)}_{8i_1+14,8i_1+6,8i_1+6}$ | where, $$W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix},$$

$$\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$$

TABLE 5

| $i_1$ | $i_2$ | | | |
|---|---|---|---|---|
| | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| $i_1$ | $i_2$ | | | |
|---|---|---|---|---|
| | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where, $$W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix},$$

An index of an 8-antenna precoding matrix may be represented by a first codebook index $i_1$ and a second codebook index $i_2$; with respect to the 8-antenna codebook whose rank is 1, both the first codebook index $i_1$ and the second codebook index $i_2$ need to be represented by four bits. In order to save an overhead of a feedback resource, a PMI may be represented by four bits. This requires that subsampling be performed on the PMI or the 8-antenna codebook, where a sampling codebook in a submode 2 of a physical uplink control channel ("PUCCH" for short) mode 1-1 of the 8-antenna system is shown in Table 6:

TABLE 6

| RI | First PMI $I_{PMI1}$ | First Codebook Index $i_1$ | Second PMI $I_{PMI2}$ | Second Codebook Index $i_2$ | Total Number of Bits |
|---|---|---|---|---|---|
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

With respect to an enhanced 4-antenna codebook, in order to improve system performance without increasing complexity of codebook designing and feedback, the codebook structure design solution of the 8-antenna system may be used, and an index of a precoding matrix may also be represented by a first codebook index $i_1$ and a second codebook index $i_2$. In order to save an overhead of a feedback resource, a PMI may also be represented by four bits; this also requires that subsampling be performed on the PMI or the 4-antenna codebook.

However, with respect to a latest 4-antenna codebook used by the 3GPP LTE system, when a mode is the submode 2 of the PUCCH mode 1-1, after subsampling is performed on a codebook according to the 8-antenna subsampling table shown in Table 6, when a rank is 1, a precoding matrix has only two DFT vectors. However, a 4-antenna codebook of an R8 system has eight DFT vectors. Therefore, when a configured antenna is a uniform linear array ULA antenna, for the enhanced 4-antenna codebook in the submode 2 of the PUCCH mode 1-1, precoding matrices that are applicable to the ULA antenna are less than precoding matrices of the R8 system, and therefore performance deterioration is severe.

SUMMARY

Embodiments of the present invention provide a method for transmitting a 4-antenna precoding matrix, a user equipment and a base station, which are capable of indicating more precoding matrices that are applicable to a uniform linear array antenna without changing a feedback mode or feedback bits.

A first aspect provides a method for transmitting a 4-antenna precoding matrix, where the method includes determining a rank used for indicating the number of transmission layers; determining a first precoding matrix in a codebook set corresponding to the rank, where precoding matrices included in the codebook set are represented by a first codebook index and a second codebook index. The method also includes determining a first precoding matrix indicator PMI and a second PMI used for indicating the first precoding matrix, where the first PMI and the first codebook index have a first correspondence, and the second PMI and the second codebook index have a second correspondence. The method also includes sending the first PMI and the second PMI used for indicating the first precoding matrix to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

With reference to the first aspect, in a first possible implementation manner of the first aspect, when the rank is determined to be 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the first aspect, in a second possible implementation manner of the first aspect, when the rank is determined to be 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the first aspect, in a third possible implementation manner of the first aspect, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

With reference to the first possible implementation manner of the first aspect, in a fourth possible implementation manner of the first aspect, when the rank is determined to be 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| | $i_2$ | | | |
| | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \quad e^{j2\pi m/32}],$$

$\phi_k = e^{j\pi k/2}$, and m and k are nonnegative integers; $i_1$ represents the first codebook index; $i_2$ represents the second codebook index.

With reference to the second possible implementation manner of the first aspect, in a fifth possible implementation manner of the first aspect, when the rank is determined to be 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| | $i_2$ | | | |
| | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$v_m = [1 \quad e^{j2\pi m/32}] \, v_m = [1 \quad e^{j2\pi m'/32}]$ $\phi_k = e^{j\pi k/2}$, and m, m', and k are nonnegative integers; $i_1$ represents the first codebook index; $i_2$ represents the second codebook index.

With reference to the first aspect or any possible implementation manner of the first to the fifth possible implementation manners of the first aspect, in a sixth possible implementation manner of the first aspect, when the rank is determined to be 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

With reference to the first aspect or any possible implementation manner of the first to the fifth possible implementation manners of the first aspect, in a seventh possible implementation manner of the first aspect, when the rank is determined to be 2, the value range of n may be the set {0, 1, 2, 3, 4, 5, 6, 7} or {8, 9, 10, 11, 12, 13, 14, 15}.

A second aspect provides a method for transmitting a 4-antenna precoding matrix, where the method includes determining a rank used for indicating the number of transmission layers; determining a value of a first codebook index corresponding to one precoding matrix set in a codebook set, where the codebook set corresponds to the rank, and a precoding matrices included in the codebook set are represented by the first codebook index and a second codebook index. The method also includes determining a jointly coded value corresponding to the rank and the value of the first codebook index, where the jointly coded value and the rank have a first correspondence, and the jointly coded value and the first codebook index have a second correspondence. The method also includes sending the jointly coded value to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

With reference to the second aspect, in a first possible implementation manner of the second aspect, when the rank is determined to be 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the second aspect, in a second possible implementation manner of the second aspect, when the rank is determined to be 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the second aspect or either possible implementation manner of the first to the second possible implementation manners of the second aspect, in a third possible implementation manner of the second aspect, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

With reference to the second aspect or either possible implementation manner of the first to the second possible implementation manners of the second aspect, in a fourth possible implementation manner of the second aspect, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and represents the first codebook index.

A third aspect provides a method for transmitting a 4-antenna precoding matrix, where the method includes: determining a rank used for indicating the number of transmission layers; determining a first precoding matrix in a codebook set corresponding to the rank, where precoding matrices included in the codebook set are represented by a first codebook index and a second codebook index; determining a second precoding matrix indicator PMI used for indicating the first precoding matrix, where the second PMI and the second codebook index have a first correspondence, and for one given first codebook index, a value range of the second codebook index corresponding to a value range of the second PMI is a proper subset of a value range of the second codebook index; and sending the second PMI used for indicating the first precoding matrix to a base station, where the precoding matrices W included in the codebook set satisfy the following equation:
$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$;

the first codebook index corresponds to one value of n, and a value range of n is a set $\{0, 1, 2, 3, 4, 5, 6, 7, 8, 9, 10, 11, 12, 13, 14, 15\}$; and when the rank is determined to be 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and a $\in \{0, 1, 2, 3, 4, 5, 6, 7\}$.

With reference to the third aspect, in a first possible implementation manner of the third aspect, when the rank is determined to be 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the third aspect, in a second possible implementation manner of the third aspect, when the rank is determined to be 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$
$(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the third aspect or either possible implementation manner of the first to the second possible implementation manners of the third aspect, in a third possible implementation manner of the third aspect, when the rank is determined to be 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

With reference to the third aspect or either possible implementation manner of the first to the second possible implementation manners of the third aspect, in a fourth possible implementation manner of the third aspect, when the rank is determined to be 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | 2 | 3 | 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

A fourth aspect provides a method for transmitting a 4-antenna precoding matrix, where the method includes receiving a rank used for indicating the number of transmission layers, a first precoding matrix indicator PMI, and a second PMI that are sent by a user equipment. The method includes determining a first precoding matrix in a codebook set corresponding to the rank according to the first PMI and the second PMI, where precoding matrices included in the codebook set are represented by a first codebook index and a second codebook index, the first PMI and the first codebook index have a first correspondence, and the second PMI and the second codebook index have a second correspondence, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

With reference to the fourth aspect, in a first possible implementation manner of the fourth aspect, when the received rank is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the fourth aspect, in a second possible implementation manner of the fourth aspect, when the received rank is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the fourth aspect, in a third possible implementation manner of the fourth aspect, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta=j^{\lfloor n/4 \rfloor}*\alpha(i)$, $i=(n \bmod 4)+1$, $\alpha(i)=q_1^{2(i-1)}$, and A is a constant.

With reference to the first possible implementation manner of the fourth aspect, in a fourth possible implementation manner of the fourth aspect, when the received rank is 1, the precoding matrices W included in the codebook set are determined according to Table A:

TABLE A

| $i_1$ | | $i_2$ | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |

| $i_1$ | | $i_2$ | | |
|---|---|---|---|---|
| | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |

| $i_1$ | | $i_2$ | | |
|---|---|---|---|---|
| | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |

| $i_1$ | | $i_2$ | | |
|---|---|---|---|---|
| | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi\frac{(m-i_1)/4}{32}}, v_m = [1 \ e^{j2\pi m/32}],$$

$\varphi_k=e^{j\pi k/2}$, and m and k are nonnegative integers; $i_1$ represents the first codebook index; $i_2$ represents the second codebook index.

With reference to the second possible implementation manner of the fourth aspect, in a fifth possible implementation manner of the fourth aspect, when the received rank is 2, the precoding matrices W included in the codebook set are determined according to Table B1 or B2:

TABLE B1

| $i_1$ | | $i_2$ | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | | $i_2$ | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | | $i_2$ | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

TABLE B1-continued

| $i_1$ | | $i_2$ | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | | $i_2$ | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | | $i_2$ | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | | $i_2$ | | |
|---|---|---|---|---|
| | 8 | 9 | 10 | 11 |
| 0-15 | $\tilde{W}_{i_1+8,i_1+24,0}^{(2)}$ | $\tilde{W}_{i_1+8,i_1+24,0}^{(2)}$ | $\tilde{W}_{i_1+8,i_1+24,2}^{(2)}$ | $\tilde{W}_{i_1+8,i_1+24,2}^{(2)}$ |

| $i_1$ | | $i_2$ | | |
|---|---|---|---|---|
| | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$v_m = [1 \ e^{j2\pi m/32}], v_{m'} = [1 \ e^{j2\pi m'/32}],$ $\varphi_k=e^{j\pi k/2}$, and m, m', and k are nonnegative integers; $i_1$ represents the first codebook index; $i_2$ represents the second codebook index.

With reference to the fourth aspect or any possible implementation manner of the first to the fifth possible implementation manners of the fourth aspect, in a sixth possible implementation manner of the fourth aspect, when the received rank is 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |

TABLE C1-continued

| $I_{PMI1}$ | $i_1 = I_{PMI1}$ | $I_{PMI2}$ | $i_2$ |
|---|---|---|---|
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

With reference to the fourth aspect or any possible implementation manner of the first to the fifth possible implementation manners of the fourth aspect, in a seventh possible implementation manner of the fourth aspect, when the received rank is 2, the value range of n may be the set {0, 1, 2, 3, 4, 5, 6, 7} or {8, 9, 10, 11, 12, 13, 14, 15}.

A fifth aspect provides a method for transmitting a 4-antenna precoding matrix, where the method includes receiving a jointly coded value sent by a user equipment. The method also includes determining a value of a first codebook index and a rank used for indicating the number of transmission layers according to the jointly coded value, a correspondence between the jointly coded value and the rank and a correspondence between the jointly coded value and the first codebook index, where the value of the first codebook index corresponds to one precoding matrix set in a codebook set, the codebook set corresponds to the rank, precoding matrices included in the codebook set are represented by the first codebook index and a second codebook index, and the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

With reference to the fifth aspect, in a first possible implementation manner of the fifth aspect, when the rank is determined to be 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the fifth aspect, in a second possible implementation manner of the fifth aspect, when the rank is determined to be 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or

-continued $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$ where $e_i$ represents a column vector with a dimension of 4×1, an $i^{th}$ element in $e_i$ is 1, all other elements are 0, and $i \in \{1, 2, 3, 4\}$; B is a constant.

With reference to the fifth aspect or either possible implementation manner of the first to the second possible implementation manners of the fifth aspect, in a third possible implementation manner of the fifth aspect, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

With reference to the fifth aspect or either possible implementation manner of the first to the second possible implementation manners of the fifth aspect, in a fourth possible implementation manner of the fifth aspect, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and $i_1$ represents the first codebook index.

A sixth aspect provides a method for transmitting a 4-antenna precoding matrix, where the method includes receiving a second precoding matrix indicator PMI, a first codebook index, and a rank used for indicating the number of transmission layers that are sent by a user equipment. The method includes determining a first precoding matrix in a codebook set corresponding to the rank according to the second PMI and the first codebook index, where precoding matrices included in the codebook set are represented by the first codebook index and a second codebook index, the second PMI and the second codebook index have a first correspondence, and for one given first codebook index, a value range of the second codebook index corresponding to a value range of the second PMI is a proper subset of a value range of the second codebook index, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15;

the first codebook index corresponds to one value of n, and a value range of n is a set {0, 1, 2, 3, 4, 5, 6, 7, 8, 9, 10, 11, 12, 13, 14, 15}; and when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and $a \in \{0, 1, 2, 3, 4, 5, 6, 7\}$.

With reference to the sixth aspect, in a first possible implementation manner of the sixth aspect, when the received rank is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the sixth aspect, in a second possible implementation manner of the sixth aspect, when the received rank is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\};$ or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$ where $e_i$ represents a column vector with a dimension of 4×1, an $i^{th}$ element in $e_i$ is 1, all other elements are 0, and $i \in \{1, 2, 3, 4\}$; B is a constant.

With reference to the sixth aspect or either possible implementation manner of the first to the second possible implementation manners of the sixth aspect, in a third possible implementation manner of the sixth aspect, when the received rank is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

With reference to the sixth aspect or either possible implementation manner of the first to the second possible implementation manners of the sixth aspect, in a fourth possible implementation manner of the sixth aspect, when the received rank is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

A seventh aspect provides a user equipment, where the user equipment includes: a determining module, configured to determine a rank used for indicating the number of transmission layers, further configured to determine a first precoding matrix in a codebook set corresponding to the rank, where precoding matrices included in the codebook set are represented by a first codebook index and a second codebook index, and further configured to determine a first precoding matrix indicator PMI and a second PMI used for indicating the first precoding matrix, where the first PMI and the first codebook index have a first correspondence, and the second PMI and the second codebook index have a second correspondence; and a sending module, configured to send, to a base station, the first PMI and the second PMI that are used for indicating the first precoding matrix and determined by the determining module, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

With reference to the seventh aspect, in a first possible implementation manner of the seventh aspect, when the rank determined by the determining module is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the seventh aspect, in a second possible implementation manner of the seventh aspect, when the rank determined by the determining module is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\};$ or

-continued $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the seventh aspect, in a third possible implementation manner of the seventh aspect, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

With reference to the first possible implementation manner of the seventh aspect, in a fourth possible implementation manner of the seventh aspect, when the rank determined by the determining module is 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \ e^{j2\pi m/32}],$$

$\phi_k = e^{j\pi k/2}$, and m and k are nonnegative integers; $i_1$ represents the first codebook index; $i_2$ represents the second codebook index.

With reference to the second possible implementation manner of the seventh aspect, in a fifth possible implementation manner of the seventh aspect, when the rank determined by the determining module is 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| $i_1$ | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$v_m = [1 \ e^{j2\pi m/32}], v_{m'} = [1 \ e^{j2\pi m'/32}],$ $\phi_k = e^{j\pi k/2}$, and m, m', and k are nonnegative integers; $i_1$ represents the first codebook index; $i_2$ represents the second codebook index.

With reference to the seventh aspect or any possible implementation manner of the first to the fifth possible implementation manners of the seventh aspect, in a sixth possible implementation manner of the seventh aspect, when the rank determined by the determining module is 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

With reference to the seventh aspect or any possible implementation manner of the first to the fifth possible implementation manners of the seventh aspect, in a seventh possible implementation manner of the seventh aspect, when the rank determined by the determining module is 2, the value range of n may be the set {0, 1, 2, 3, 4, 5, 6, 7} or {8, 9, 10, 11, 12, 13, 14, 15}.

An eighth aspect provides a user equipment, where the user equipment includes: a determining module, configured to determine a rank used for indicating the number of transmission layers, further configured to determine a value of a first codebook index corresponding to one precoding matrix set in a codebook set, where the codebook set corresponds to the rank, and precoding matrices included in the codebook set are represented by the first codebook index and a second codebook index, and further configured to determine a jointly coded value corresponding to the rank and the value of the first codebook index, where the jointly coded value and the rank have a first correspondence, and the jointly coded value and the first codebook index have a second correspondence; and a sending module, configured to send the jointly coded value determined by the determining module to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

With reference to the eighth aspect, in a first possible implementation manner of the eighth aspect, when the rank determined by the determining module is 1, $W_2$ satisfies the following equation:

$$W_2 \in \left\{ \frac{1}{A} \begin{bmatrix} Y \\ \alpha(i)Y \end{bmatrix}, \frac{1}{A} \begin{bmatrix} Y \\ j\alpha(i)Y \end{bmatrix}, \frac{1}{A} \begin{bmatrix} Y \\ -\alpha(i)Y \end{bmatrix}, \frac{1}{A} \begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the eighth aspect, in a second possible implementation manner of the eighth aspect, when the rank determined by the determining module is 2, $W_2$ satisfies the following equation:

$$W_2 \in \left\{ \frac{1}{B} \begin{bmatrix} Y_1 & Y_2 \\ Y_1 & -Y_2 \end{bmatrix}, \frac{1}{B} \begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$
$(e_4, e_4), (e_1, e_2), (e_2, e_3), (e_1, e_4), (e_2, e_4)\}$; or $$W_2 \in \left\{ \frac{1}{B} \begin{bmatrix} Y_1 & Y_2 \\ Y_1 & Y_2 \end{bmatrix}, \frac{1}{B} \begin{bmatrix} Y_1 & Y_2 \\ Y_1 & -Y_2 \end{bmatrix}, \frac{1}{B} \begin{bmatrix} Y_1 & Y_2 \\ -Y_1 & Y_2 \end{bmatrix}, \frac{1}{B} \begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B} \begin{bmatrix} Y_1 & Y_2 \\ Y_1 & -Y_2 \end{bmatrix}, \frac{1}{B} \begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B} \begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the eighth aspect or either possible implementation manner of the first to the second possible implementation manners of the eighth aspect, in a third possible implementation manner of the eighth aspect, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and represents the first codebook index.

With reference to the eighth aspect or either possible implementation manner of the first to the second possible implementation manners of the eighth aspect, in a fourth possible implementation manner of the eighth aspect, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and represents the first codebook index.

A ninth aspect provides a user equipment, where the user equipment includes a determining module, configured to determine a rank used for indicating the number of transmission layers, further configured to determine a first precoding matrix in a codebook set corresponding to the rank, where precoding matrices included in the codebook set are represented by a first codebook index and a second codebook index, and further configured to determine a second precoding matrix indicator PMI used for indicating the first precoding matrix, where the second PMI and the second codebook index have a first correspondence, and for one given first codebook index, a value range of the second codebook index corresponding to a value range of the second PMI is a proper subset of a value range of the second codebook index; and a sending module, configured to send, to a base station, the second PMI that is used for indicating the first precoding matrix and determined by the determining module, where the precoding matrices W included in the codebook set satisfy the following equation:
$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$;
the first codebook index corresponds to one value of n, and a value range of n is a set $\{0, 1, 2, 3, 4, 5, 6, 7, 8, 9, 10, 11, 12, 13, 14, 15\}$; and when the rank determined by the determining module is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and $a \in \{0, 1, 2, 3, 4, 5, 6, 7\}$.

With reference to the ninth aspect, in a first possible implementation manner of the ninth aspect, when the rank determined by the determining module is 1, $W_2$ satisfies the following equation:

$$W_2 \in \left\{ \frac{1}{A} \begin{bmatrix} Y \\ \alpha(i)Y \end{bmatrix}, \frac{1}{A} \begin{bmatrix} Y \\ j\alpha(i)Y \end{bmatrix}, \frac{1}{A} \begin{bmatrix} Y \\ -\alpha(i)Y \end{bmatrix}, \frac{1}{A} \begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the ninth aspect, in a second possible implementation manner of the ninth aspect, when the rank determined by the determining module is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), (e_2, e_2),$$

$$(e_3, e_3), (e_4, e_4), (e_1, e_2), (e_2, e_3), (e_1, e_4), (e_2, e_4)\}; \text{ or}$$

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$$(Y_1, Y_2) \in \{(e_2, e_4)\}$$

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$$\{(e_1, e_1), (e_2, e_2), (e_3, e_3), (e_4, e_4)\}$$

$$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the ninth aspect or either possible implementation manner of the first to the second possible implementation manners of the ninth aspect, in a third possible implementation manner of the ninth aspect, when the rank determined by the determining module is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | 2 × $I_{PMI2}$ |
| | 8-15 | 2 × $I_{PMI2}$ + 1 |

TABLE F2

| $I_{PMI2}$ | $i_1$ | $i_2$ |
|---|---|---|
| 0-3 | 0-7 | 2 × $I_{PMI2}$ |
| | 8-15 | 2 × $I_{PMI2}$ + 8 | where $I_{PMI2}$ represents the second PMI, $i_1$ represents the first codebook index, and $i_2$ represents the second codebook index.

With reference to the ninth aspect or either possible implementation manner of the first to the second possible implementation manners of the ninth aspect, in a fourth possible implementation manner of the ninth aspect, when the rank determined by the determining module is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | 2 | 3 | 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

A tenth aspect provides a base station, where the base station includes a receiving module, configured to receive a rank used for indicating the number of transmission layers, a first precoding matrix indicator PMI, and a second PMI that are sent by a user equipment; and a determining module, configured to determine, according to the first PMI and the second PMI received by the receiving module, a first precoding matrix in a codebook set corresponding to the rank received by the receiving module, where precoding matrices included in the codebook set are represented by a first codebook index and a second codebook index, the first PMI and the first codebook index have a first correspondence, and the second PMI and the second codebook index have a second correspondence, where the precoding matrices W included in the codebook set satisfy the following equation: $W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

With reference to the tenth aspect, in a first possible implementation manner of the tenth aspect, when the rank received by the receiving module is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the tenth aspect, in a second possible implementation manner of the tenth aspect, when the rank received by the receiving module is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), (e_2, e_2),$$

$$(e_3, e_3), (e_4, e_4), (e_1, e_2), (e_2, e_3), (e_1, e_4), (e_2, e_4)\}; \text{ or}$$

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$$(Y_1, Y_2) \in \{(e_2, e_4)\}$$

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$$\{(e_1, e_1), (e_2, e_2), (e_3, e_3), (e_4, e_4)\}$$

$$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the tenth aspect, in a third possible implementation manner of the tenth aspect, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

With reference to the first possible implementation manner of the tenth aspect, in a fourth possible implementation manner of the tenth aspect, when the rank received by the receiving module is 1, the precoding matrices W included in the codebook set are determined according to Table A:

TABLE A

| | $i_2$ | | | |
|---|---|---|---|---|
| $i_1$ | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |

TABLE A-continued

| | $i_2$ | | | |
|---|---|---|---|---|
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \ e^{j2\pi m/32}],$$

$\phi_k = e^{j\pi k/2}$, and m and k are nonnegative integers; $i_1$ represents the first codebook index; $i_2$ represents the second codebook index.

With reference to the second possible implementation manner of the tenth aspect, in a fifth possible implementation manner of the tenth aspect, when the rank received by the receiving module is 2, the precoding matrices W included in the codebook set are determined according to Table B1 or B2:

TABLE B1

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

TABLE B2-continued

| | $i_2$ | | | |
|---|---|---|---|---|
| $i_1$ | 4 | 5 | 6 | 7 |
| 0-15 | $W^{(2)}_{i_1+16,i_1+16,0}$ | $W^{(2)}_{i_1+16,i_1+16,1}$ | $W^{(2)}_{i_1+24,i_1+24,0}$ | $W^{(2)}_{i_1+24,i_1+24,1}$ |

| | $i_2$ | | | |
|---|---|---|---|---|
| $i_1$ | 8 | 9 | 10 | 11 |
| 0-15 | $\tilde{W}^{(2)}_{i_1+8,i_1+24,0}$ | $W^{(2)}_{i_1+8,i_1+24,0}$ | $W^{(2)}_{i_1+8,i_1+24,2}$ | $\tilde{W}^{(2)}_{i_1+8,i_1+24,2}$ |

| | $i_2$ | | | |
|---|---|---|---|---|
| $i_1$ | 12 | 13 | 14 | 15 |
| 0-15 | $\tilde{\tilde{W}}^{(2)}_{i_1,i_1+16,0}$ | $\tilde{\tilde{W}}^{(2)}_{i_1+8,i_1+24,0}$ | $\tilde{\tilde{W}}^{(2)}_{i_1+16,i_1,0}$ | $\tilde{\tilde{W}}^{(2)}_{i_1+24,i_1+8,0}$ | where $$W^{(2)}_{m,m',k} = \frac{1}{\sqrt{8}} \begin{bmatrix} v_m & v_{m'} \\ \varphi_k v_m & -\varphi_k v_{m'} \end{bmatrix},$$

$$\tilde{W}^{(2)}_{m,m',k} = \frac{1}{\sqrt{8}} \begin{bmatrix} v_m & v_{m'} \\ \varphi_k v_m & \varphi_k v_{m'} \end{bmatrix},$$

$$\tilde{\tilde{W}}^{(2)}_{m,m',k} = \frac{1}{\sqrt{8}} \begin{bmatrix} v_m & v_{m'} \\ \varphi_k v_{m'} & -\varphi_k v_m \end{bmatrix},$$

$$v_m = [1 \quad e^{j2\pi m/32}], v_{m'} = [1 \quad e^{j2\pi m'/32}],$$

$\phi_k = e^{j\pi k/2}$, and m, m', and k are nonnegative integers; $i_1$ represents the first codebook index; $i_2$ represents the second codebook index.

With reference to the tenth aspect or any possible implementation manner of the first to the fifth possible implementation manners of the tenth aspect, in a sixth possible implementation manner of the tenth aspect, when the rank received by the receiving module is 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

With reference to the tenth aspect or any possible implementation manner of the first to the fifth possible implementation manners of the tenth aspect, in a seventh possible implementation manner of the tenth aspect, when the rank received by the receiving module is 2, the value range of n may be the set {0, 1, 2, 3, 4, 5, 6, 7} or {8, 9, 10, 11, 12, 13, 14, 15}.

An eleventh aspect provides a base station, where the base station includes a receiving module, configured to receive a jointly coded value sent by a user equipment; and a determining module, configured to determine a value of a first codebook index and a rank used for indicating the number of transmission layers according to the jointly coded value received by the receiving module, a correspondence between the jointly coded value and the rank and a correspondence between the jointly coded value and the first codebook index, where the value of the first codebook index corresponds to one precoding matrix set in a codebook set, the codebook set corresponds to the rank, precoding matrices included in the codebook set are represented by the first codebook index and a second codebook index, and the precoding matrices W included in the codebook set satisfy the following equation:
$W=W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1=e^{j2\pi/32}$, and n=0, 1, . . . , 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

With reference to the eleventh aspect, in a first possible implementation manner of the eleventh aspect, when the rank determined by the determining module is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i)=q_1^{2(i-1)}$; when Y is $e_1$, $\alpha(i)$ is $\alpha(1)$; when Y is $e_1$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the eleventh aspect, in a second possible implementation manner of the eleventh aspect, when the rank determined by the determining module is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), (e_2, e_2),$$

$(e_3, e_3), (e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the eleventh aspect or either possible implementation manner of the first to the second possible implementation manners of the eleventh aspect, in a third possible implementation manner of the eleventh aspect, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

With reference to the eleventh aspect or either possible implementation manner of the first to the second possible implementation manners of the eleventh aspect, in a fourth possible implementation manner of the eleventh aspect, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and $i_1$ represents the first codebook index.

A twelfth aspect provides a base station, where the base station includes a receiving module, configured to receive a second precoding matrix indicator PMI, a first codebook index, and a rank used for indicating the number of transmission layers that are sent by a user equipment. The base station also includes a determining module, configured to determine, according to the second PMI and the first codebook index received by the receiving module, a first precoding matrix in a codebook set corresponding to the rank received by the receiving module, where precoding matrices included in the codebook set are represented by the first codebook index and a second codebook index, the second PMI and the second codebook index have a first correspondence, and for one given first codebook index, a value range of the second codebook index corresponding to a value range of the second PMI is a proper subset of a value range of the second codebook index, where the precoding matrices W included in the codebook set satisfy the following equation:
$W=W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1=e^{j2\pi/32}$, and n=0, 1, . . . , 15;

the first codebook index corresponds to one value of n, and a value range of n is a set {0, 1, 2, 3, 4, 5, 6, 7, 8, 9, 10, 11, 12, 13, 14, 15}; and when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and $a \in \{0, 1, 2, 3, 4, 5, 6, 7\}$.

With reference to the twelfth aspect, in a first possible implementation manner of the twelfth aspect, when the rank received by the receiving module is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

With reference to the twelfth aspect, in a second possible implementation manner of the twelfth aspect, when the rank received by the receiving module is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), (e_2, e_2),$$

$(e_3, e_3), (e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

With reference to the twelfth aspect or either possible implementation manner of the first to the second possible implementation manners of the twelfth aspect, in a third possible implementation manner of the twelfth aspect, when the rank received by the receiving module is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

With reference to the twelfth aspect or either possible implementation manner of the first to the second possible implementation manners of the twelfth aspect, in a fourth possible implementation manner of the twelfth aspect, when the rank received by the receiving module is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | 2 | 3 | 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ 1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ 1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n=I-2u_n u_n^H/u_n^H u_n$, and I is a 4×4 identity matrix.

Based on the foregoing technical solutions, by means of the method for transmitting a 4-antenna precoding matrix, and the user equipment and the base station according to the embodiments of the present invention, more precoding matrices that are applicable to a uniform linear array antenna may be indicated without changing a feedback mode or feedback bits, and it may be ensured that performance for application of a dual-polarized antenna is not affected.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments may be applied to various communications systems, such as: a Global System of Mobile Communications ("GSM" for short) system, a Code Division Multiple Access ("CDMA" for short) system, a Wideband Code Division Multiple Access ("WCDMA" for short) system, a general packet radio service ("GPRS" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), a Worldwide Interoperability for Microwave Access ("Wi-MAX" for short) communications system or the like.

It should also be understood that in the embodiments of the present invention, a user equipment ("UE" for short) may be referred to as a terminal, a mobile station ("MS" for short), a mobile terminal, and the like. The user equipment may communicate with one or more core networks through a radio access network ("RAN" for short). For example, the user equipment may be a mobile phone (also referred to as a "cellular" phone) or a computer with a mobile terminal. For example, the user equipment may also be a portable, pocket-sized, handheld, computer built-in, or vehicle-mounted mobile apparatus, which exchanges voice and/or data with the radio access network.

In the embodiments of the present invention, a base station may be a base station ("BTS" for short) in GSM or CDMA, or may be a NodeB ("NB" for short) in WCDMA, or may be an evolved NodeB ("eNB" or "e-NodeB" for short) in LTE, which is not limited in the present invention. However, for ease of description, the following embodiments are described by using an eNB as an example.

Figure 1:
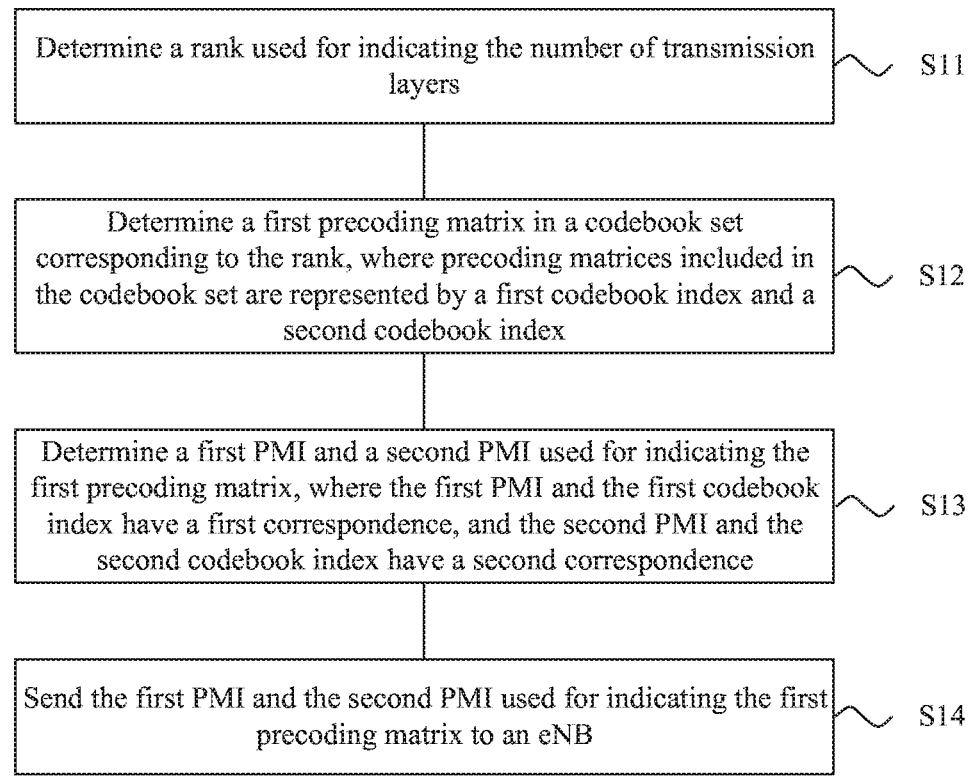
FIG. 1 is a schematic flowchart of a method for transmitting a 4-antenna precoding matrix according to an embodiment.

FIG. 1 shows a schematic flowchart of a method 10 for transmitting a 4-antenna precoding matrix according to an embodiment. The method 10 may be performed, for example, by a user equipment. As shown in FIG. 1, the method 10 includes the following steps.

S11. Determine a rank used for indicating the number of transmission layers.

S12. Determine a first precoding matrix in a codebook set corresponding to the rank, where precoding matrices included in the codebook set are represented by a first codebook index and a second codebook index.

S13. Determine a first precoding matrix indicator PMI and a second PMI used for indicating the first precoding matrix, where the first PMI and the first codebook index have a first correspondence, and the second PMI and the second codebook index have a second correspondence.

S14. Send the first PMI and the second PMI used for indicating the first precoding matrix to a base station.

The precoding matrices W included in the codebook set satisfy the following equation:
$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6, 8, 10, 12, 14}, or {1, 3, 5, 7, 9, 11, 13, 15}.

Therefore, by means of the method for transmitting a 4-antenna precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Specifically, in S11, the user equipment may determine the rank used for indicating the number of transmission layers, for example, based on channel state information ("CSI" for short). It should be understood that the UE may determine the rank by using a method that is well known to a person skilled in the art, which is not described herein any further for brevity.

In S12, the user equipment UE may determine, in the codebook set corresponding to the rank, for example, based on CSI, the first precoding matrix that the UE wants the eNB to use when the eNB sends downlink data. All precoding matrices included in the codebook set corresponding to the rank may be represented, for example, by the first codebook index $i_1$ and the second codebook index $i_2$.

In this embodiment of the present invention, optionally, a value range of the first codebook index $i_1$ is $0 \le i_1 \le 15$, and a value range of the second codebook index $i_2$ is $0 \le i_2 \le L_2-1$, where $L_2$ is a positive integer. For example, a value range of $L_2$ is $1 \le L_2 \le 16$, that is, the value range of the second codebook index $i_2$ is, for example, $0 \le i_2 \le 15$.

In S13, the UE may determine the first PMI and the second PMI used for indicating the first precoding matrix. That is, in this embodiment, all the precoding matrices included in the codebook set corresponding to the rank may be represented not only by the first codebook index $i_1$ and the second codebook index $i_2$, but also by the first PMI $I_{PMI1}$ and the second PMI $I_{PMI2}$.

In this embodiment, the first PMI $I_{PMI1}$ and the first codebook index $i_1$ may have the first correspondence, where the first correspondence may be a functional relationship or a mapping relationship, for example, $i_1 = 1 * I_{PMI1}$. The second PMI $I_{PMI1}$ and the second codebook index $i_2$ may have the second correspondence, where the second correspondence may be a functional relationship or a mapping relationship, for example, the second PMI $I_{PMI2}$ is used for indicating a sequence number of a value in the value range of the second codebook index $i_2$.

It should be understood that in this embodiment, a set formed by precoding matrices represented by the first PMI $I_{PMI1}$ and the second PMI $I_{PMI2}$ is a proper subset of the codebook set; that is, in this embodiment of the present invention, the transmitted 4-antenna precoding matrix is a 4-antenna precoding matrix on which subsampling (subsampling) is performed.

In S14, the user equipment sends the first PMI and the second PMI used for indicating the first precoding matrix to the base station on a channel, for example, a PUCCH channel, a physical uplink shared channel ("PUSCH" for short), or another channel.

Optionally, in this embodiment of the present invention, the user equipment sends the first PMI and the second PMI used for indicating the first precoding matrix to the base station on one uplink channel. The uplink channel may be a channel such as a PUCCH or a PUSCH. For example, the user equipment transmits the first PMI and the second PMI used for indicating the first precoding matrix on one PUCCH, or the user equipment transmits the first PMI and the second PMI used for indicating the first precoding matrix on one PUSCH. It should be understood that the user equipment may also separately send the first PMI and the second PMI used for indicating the first precoding matrix to the base station, and this embodiment of the present invention is not limited thereto.

In this embodiment of the present invention, the precoding matrices W included in the codebook set corresponding to the rank satisfy the following equation (4):

$$W = W_1 \times W_2 \qquad (4)$$

where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, , and n=0, 1, ..., 15.

In this embodiment, one first codebook index corresponds to one value of n, and a value range of n is a set {0, 1, 2, 3, 4, 5, 6, 7}, {8, 9, 10, 11, 12, 13, 14, 15}, {0, 2, 4, 6, 8, 10, 12, 14}, or {1, 3, 5, 7, 9, 11, 13, 15}.

Optionally, in this embodiment, the first codebook index and n have the same value. For example, when a value of the first codebook index is 1, a value of n is also 1; that is, when $i_1=1$, n=1. It should be understood that this embodiment is described merely by using a case that the first codebook index and n have the same value as an example, but the present invention is not limited thereto as long as the value of n is uniquely determined according to the value of the first codebook index.

In this embodiment, optionally, when the rank is determined to be 2, the value range of n may be the set {0, 1, 2, 3, 4, 5, 6, 7} or {8, 9, 10, 11, 12, 13, 14, 15}.

In this embodiment of the present invention, optionally, when the rank is determined to be 1, $W_2$ satisfies the following equation (5):

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\}, \qquad (5)$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank is determined to be 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| | $i_2$ | | | |
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi\frac{(m-i_1)/4}{32}}, v_m = [\,1\ \ e^{j2\pi m/32}\,],$$

$\phi_k = e^{j\pi k/2}$, and m and k are nonnegative integers; $i_1$ represents the first codebook index; $i_2$ represents the second codebook index.

In this embodiment, optionally, when the rank determined by the UE is 2, $W_2$ satisfies the following equation (6):

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), \quad (6)$$

$$(e_2, e_2), (e_3, e_3), (e_4, e_4), (e_1, e_2), (e_2, e_3), (e_1, e_4), (e_2, e_4)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the rank is determined to be 2, $W_2$ satisfies the following equation (7):

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\} \quad (7)$$

$$(Y_1, Y_2) \in \{(e_2, e_4)\}$$

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$$\{(e_1, e_1), (e_2, e_2), (e_3, e_3), (e_4, e_4)\}$$

$$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

That is, in this embodiment, when the user equipment determines that the rank used for indicating the number of transmission layers is 2, $W_2$ satisfies the equation (6) or $W_2$ satisfies the equation (7).

In this embodiment, optionally, when the rank determined by the UE is 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| | $i_2$ | | | |
| $i_1$ | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$$v_m = [\,1\ \ e^{j2\pi m/32}\,], v_{m'} = [\,1\ \ e^{j2\pi m'/32}\,],$$

$\phi_k = e^{j\pi k/2}$, and m, m', and k are nonnegative integers; $i_1$ represents the first codebook index; $i_2$ represents the second codebook index.

It should be understood that in the embodiments, Table A, Table B1, and Table B2 provide only one presentation manner of the precoding matrix W, where $i_1$ may correspond to $W_1$ in the precoding matrix $W=W_1 \times W_2$, and $i_2$ may correspond to $W_2$. This embodiment is described merely by using the first codebook index, the second codebook index, and values thereof in Table A, Table B1, and Table B2 as an example, but the present invention is not limited thereto. The precoding matrix W determined in Table A, Table B1, and Table B2 may be further represented by using another index or another index value.

In this embodiment of the present invention, optionally, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4)+1$, $\alpha(i) = q_1^{2(i-1)}$, and A is a constant.

It should be understood that in this embodiment, "mod" represents a modulo operation.

Therefore, by means of the method for transmitting a 4-antenna precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Figure 7:
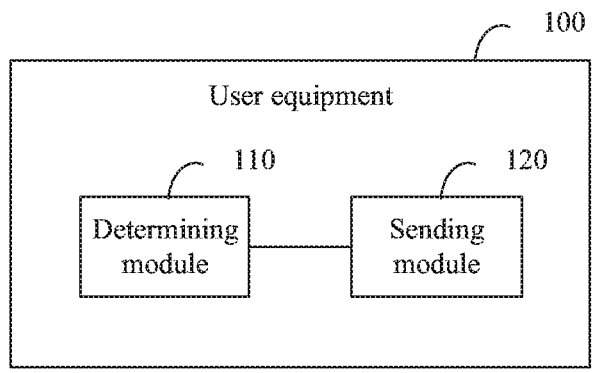
FIG. 7 is a schematic block diagram of a user equipment according to an embodiment.

In this embodiment, by analyzing a 4-antenna precoding matrix that is proposed in 3GPP and whose rank is $i_1$ it is known that a total of 16 DFT vectors are included in all 4-antenna precoding matrices/vectors whose rank is $i_1$ as shown in FIG. 7.

TABLE 7

| $i_1$ | $i_2$ | DFT Vector |
|---|---|---|
| 0 | 0 (select the first vector of $W_1$) | Yes |
| 1 | 6 (select the second vector of $W_1$) | Yes |
| 2 | 8 (select the third vector of $W_1$) | Yes |
| 3 | 14 (select the fourth vector of $W_1$) | Yes |
| 4 | 1 (select the first vector of $W_1$) | Yes |
| 5 | 7 (select the second vector of $W_1$) | Yes |
| 6 | 9 (select the third vector of $W_1$) | Yes |
| 7 | 15 (select the fourth vector of $W_1$) | Yes |
| 8 | 2 (select the first vector of $W_1$) | Yes |
| 9 | 4 (select the second vector of $W_1$) | Yes |
| 10 | 10 (select the third vector of $W_1$) | Yes |
| 11 | 12 (select the fourth vector of $W_1$) | Yes |
| 12 | 3 (select the first vector of $W_1$) | Yes |
| 13 | 5 (select the second vector of $W_1$) | Yes |
| 14 | 11 (select the third vector of $W_1$) | Yes |
| 15 | 13 (select the fourth vector of $W_1$) | Yes |

According to Table 7, when the value of the first codebook index $i_1$ or n is given, that is, $W_1$ is given, a DFT vector can be formed in only one of four beam directions or four vectors. Moreover, for $i_1$ and $i_1+8$, where $i_1=0, 1, 2, 3, 4, 5, 6, 7$, $X_n$ in $W_1$ includes four beam directions which are the same, and a difference between them lies in that a value of $\alpha(i)$ is different for a same beam direction.

For example, with respect to $i_1=0$, $$X_0 = \begin{bmatrix} 1 & 1 & 1 & 1 \\ e^{j2\pi(0)/32} & e^{j2\pi(8)/32} & e^{j2\pi(16)/32} & e^{j2\pi(24)/32} \end{bmatrix};$$

with respect to $i_1=8$, $$X_8 = \begin{bmatrix} 1 & 1 & 1 & 1 \\ e^{j2\pi(8)/32} & e^{j2\pi(16)/32} & e^{j2\pi(24)/32} & e^{j2\pi(0)/32} \end{bmatrix}.$$

That is, when $i_1=0$, a first vector of $X_0$ is $$\begin{bmatrix} 1 \\ e^{j2\pi(0)/32} \end{bmatrix};$$

when $i_1=8$, a first vector of $X_8$ is $$\begin{bmatrix} 1 \\ e^{j2\pi(8)/32} \end{bmatrix}.$$

Therefore, a column shift is performed on the two of $X_0$ and $X_8$, but vectors included in $X_0$ and $X_8$ are the same.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes the value range of the second codebook index corresponding to the second PMI is uniquely determined according to the value and/or the value range of the first codebook index corresponding to the first PMI.

In this embodiment, optionally, that a value range of the first codebook index corresponding to the first PMI and a value range of the second codebook index corresponding to the second PMI have an association relationship includes the value range of the first codebook index corresponding to the first PMI includes at least two first value sets having different elements, the value range of the second codebook index corresponding to the second PMI includes at least two second value sets having different elements, and the at least two first value sets and the at least two second value sets having a one-to-one correspondence.

It should be understood that the number of the first value sets is equal to the number of the second value sets. It should be further understood that the elements in the first value sets are different from each other, and the elements in the second value sets are also different from each other.

Optionally, each first value set of the at least two first value sets includes at least two values, and each second value set of the at least two second value sets includes at least two values.

In this embodiment, the value range of the first codebook index corresponding to the first PMI and the value range of the second codebook index corresponding to the second PMI have an association relationship; therefore, by means of the method for transmitting a precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

The following description uses mutual relationships between the first PMI, the second PMI, the first codebook index corresponding to the first PMI, and the second codebook index corresponding to the second PMI as an example.

In this embodiment, optionally, when the rank is determined to be 1, the first PMI, the second PMI, the first codebook index corresponding to the first PMI, and the second codebook index corresponding to the second PMI are determined according to Table C1:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 | where $I_{PMI1}$ represents the first PMI, $I_{PMI2}$ represents the second PMI, $i_1$ represents the first codebook index, and $i_2$ represents the second codebook index.

With reference to Table 7, it may be known that, when the first PMI, the second PMI, the first codebook index corresponding to the first PMI, and the second codebook index corresponding to the second PMI have the mutual relationships shown in Table C1, a codebook including 16 precoding matrices on which subsampling is performed has a total of 8 DFT vectors; in this case, as shown in Table C1, corresponding values of the second codebook index $i_2$ are 0, 1, 6, 7, 8, 9, 14, and 15.

Therefore, when a precoding matrix is transmitted by using a submode 2 of a PUCCH mode 1-1, a 4-antenna codebook according to this embodiment is as good as a codebook of a 3GPP LTE R8; moreover, each precoding matrix included in the 4-antenna codebook according to this embodiment of the present invention is applicable to a dual-polarized antenna. In Table C1, a total of 4 bits may be used to transmit the first precoding matrix, where 3 bits represent the first PMI, $i_1 = I_{PMI1}$, and one bit is used to represent the second PMI, where $i_2$ and the second PMI $I_{PMI2}$ satisfy, for example, the following equation (8):

$$i_2 = 4 \times (I_{PMI1} \bmod 4) + \lfloor I_{PMI1}/4 \rfloor + 2 I_{PMI2} \quad (8)$$

where "mod" represents modulo, and "$\lfloor \ \rfloor$" represents rounding down.

With reference to Table C1, it may be known that when a value range of $I_{PMI1}$ or $i_1$ is 0, a range of corresponding values of $i_2$ is (0, 2); when the value range of $I_{PMI1}$ is 1, the range of corresponding values of $i_2$ is (4, 6); when the value range of $I_{PMI1}$ is 2, the range of corresponding values of $i_2$ is (8, 10); when the value range of $I_{PMI1}$ is 3, the range of corresponding values of $i_2$ is (12, 14); when the value range of $I_{PMI1}$ is 4, the range of corresponding values of $i_2$ is (1, 3); when the value range of $I_{PMI1}$ is 5, the range of corresponding values of $i_2$ is (5, 7); when the value range of $I_{PMI1}$ is 6, the range of corresponding values of $i_2$ is (9, 11); and when the value range of $I_{PMI1}$ is 7, the range of corresponding values of $i_2$ is (13, 15). That is, the value or value range of $i_2$ corresponding to $I_{PMI2}$ is associated with the value or value range of $i_1$ corresponding to $I_{PMI1}$.

Therefore, by means of the method for transmitting a 4-antenna precoding matrix according to this embodiment, more precoding matrices that are applicable to a uniform linear array antenna may be indicated during codebook subsampling without changing a feedback mode or feedback bits, and each precoding matrix in a codebook set after the subsampling is applicable to a dual-polarized antenna, which may ensure that performance for application of the dual-polarized antenna is not affected, improve system performance and enhance user experience.

In this embodiment, optionally, when the rank is determined to be 1, the first PMI, the second PMI, the first codebook index corresponding to the first PMI, and the second codebook index corresponding to the second PMI are determined according to Table C2:

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

It should be understood that, in Table C2, the second codebook index $i_2$ and the second PMI $I_{PMI2}$ satisfy, for example, the following equation (9):

$$i_2 = 4 \times ((I_{PMI1} - 8) \bmod 4) + \lfloor (I_{PMI1} - 8)/4 \rfloor + 2 I_{PMI2} \quad (9)$$

where "mod" represents modulo, and "$\lfloor \ \rfloor$" represents rounding down.

Similarly, in Table C2, there are a total of 8 DFT vectors; in this case, corresponding values of the second codebook index $i_2$ are 2, 3, 4, 5, 10, 11, 12, and 13.

In this embodiment, optionally, when the rank is determined to be 1, the first PMI, the second PMI, the first codebook index corresponding to the first PMI, and the second codebook index corresponding to the second PMI are determined according to Table C3:

TABLE C3

| $I_{PMI1}$ | $i_1 = 2 I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |

TABLE C3-continued

| $I_{PMI1}$ | $i_1 = 2I_{PMI1}$ | $I_{PMI2}$ | $i_2$ |
|---|---|---|---|
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 | where $I_{PMI1}$ represents the first PMI, $I_{PMI2}$ represents the second PMI, $i_1$ represents the first codebook index, and $i_2$ represents the second codebook index.

With reference to Table 7, it may be known that when the first PMI, the second PMI, the first codebook index corresponding to the first PMI, and the second codebook index corresponding to the second PMI have the mutual relationships shown in Table C3, a codebook including 16 precoding matrices on which subsampling is performed has a total of 8 DFT vectors; in this case, as shown in Table C3, corresponding values of the second codebook index $i_2$ are 0, 1, 2, 3, 8, 9, 10, and Therefore, when a precoding matrix is transmitted by using a submode 2 of a PUCCH mode 1-1, a 4-antenna codebook according to this embodiment is as good as a codebook of a 3GPP LTE R8; moreover, each precoding matrix included in the 4-antenna codebook according to this embodiment is applicable to a dual-polarized antenna. In Table C3, a total of 4 bits may be used to transmit the first precoding matrix, where 3 bits represent the first PMI, $i_1 = I_{PMI1}$, and one bit is used to represent the second PMI, where $i_2$ and the second PMI $I_{PMI2}$ satisfy, for example, the following equation (10):

$$i_2 = 8 \times ((I_{PMI1} \bmod 4) \bmod 2) + \lfloor (I_{PMI1} \bmod 4)/2 \rfloor + 2I_{PMI2} \quad (10)$$

where "mod" represents modulo, and "$\lfloor \ \rfloor$" represents rounding down.

With reference to Table C3, when a value range of $I_{PMI1}$ is (0, 4), a corresponding value range of $i_1$ is (0, 8), and a corresponding value range of $i_2$ is (0, 2); when the value range of $I_{PMI1}$ is (1, 5), the corresponding value range of $i_1$ is (2, 10), and the corresponding value range of $i_2$ is (8, 10); when the value range of $I_{PMI1}$ is (2, 6), the corresponding value range of is (4, 12), and the corresponding value range of $i_2$ is (1, 3); when the value range of $I_{PMI1}$ is (3, 7), the corresponding value range of $i_1$ is (6, 14), and the corresponding value range of $i_2$ is (9, 11). That is, the value or value range of $i_2$ corresponding to $I_{PMI2}$ is associated with the value or value range of $i_1$ corresponding to $I_{PMI1}$.

In this embodiment, optionally, when the rank is determined to be 1, the first PMI, the second PMI, the first codebook index corresponding to the first PMI, and the second codebook index corresponding to the second PMI are determined according to Table C4:

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

Similarly, in Table C4, there are a total of 8 DFT vectors; in this case, corresponding values of the second codebook index $i_2$ are 4, 5, 6, 7, 12, 13, 14, and 15.

It should be understood that when the first PMI, the second PMI, the first codebook index corresponding to the first PMI, and the second codebook index corresponding to the second PMI have the mutual relationships shown in Table C1, C2, C3, or C4, the precoding matrix W determined according to the first codebook index $i_1$ and the second codebook index $i_2$ may be determined according to Table A, which is not described herein any further for brevity.

It should be understood that the base station (eNB) may first configure a channel state information reference signal ("CSI-RS" for short) for the UE. Specifically, with respect to Nt antennas or Nt antenna ports of the base station, the base station configures resources of antenna ports of Nt CSI-RSs for the UE, where Nt is a natural number, for example, Nt equals 4. In this case, the UE may measure channel quality on corresponding CSI-RS resources, and may determine an RI, a PMI, a CQI, and the like that the UE wants the eNB to use when the base station sends downlink data. After determining the channel state information ("CSI" for short) such as the RI, the PMI, and the CQI, the UE may feed back the CSI to the base station on a feedback resource configured by the eNB for the UE. For example, a feedback mode configured by the eNB for the UE is a submode 2 of a PUCCH mode 1-1; accordingly, the UE feeds back the RI on a subframe for feeding back the RI, and separately feeds back $I_{PMI1}$, $I_{PMI2}$, and the CQI on subframes for feeding back the first PMI $I_{PMI1}$, the second PMI $I_{PMI2}$, and the CQI, which is not described herein any further for brevity.

It should be further understood that in this embodiment, the precoding matrix set may be referred to as a codebook, and each precoding matrix in the precoding matrix set may be referred to as a code word; however, the present invention is not limited thereto.

It should be further understood that sequence numbers of the foregoing processes do not mean execution sequences in various embodiments. The execution sequences of the processes should be determined according to functions and internal logic of the processes, and should not be construed as any limitation on the implementation processes of the embodiments of the present invention.

Therefore, in the method for transmitting a 4-antenna precoding matrix according to this embodiment, the value range of the first codebook index corresponding to the first PMI and the value range of the second codebook index corresponding to the second PMI have an association relationship, so that more precoding matrices that are applicable to a uniform linear array antenna may be indicated during codebook subsampling without changing a feedback mode or feedback bits, and each precoding matrix in a codebook set after the subsampling is applicable to a dual-polarized antenna, which may ensure that performance for application of the dual-polarized antenna is not affected, improve system performance and enhance user experience.

Figure 2:
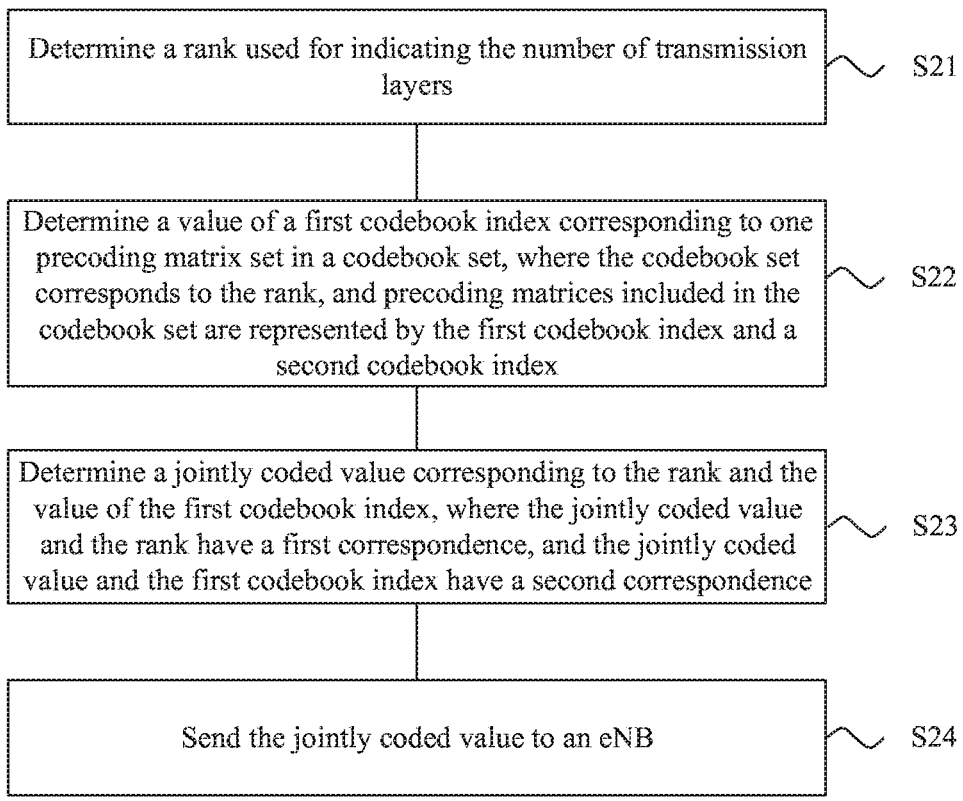
FIG. 2 is another schematic flowchart of a method for transmitting a 4-antenna precoding matrix according to an embodiment.

FIG. 2 shows a schematic flowchart of a method 20 for transmitting a 4-antenna precoding matrix according to an embodiment. The method 20 may be performed, for example, by a user equipment. As shown in FIG. 2, the method 20 includes the following steps.

S21. Determine a rank used for indicating the number of transmission layers.

S22: Determine a value of a first codebook index corresponding to one precoding matrix set in a codebook set, where the codebook set corresponds to the rank, and precoding matrices included in the codebook set are represented by the first codebook index and a second codebook index.

S23: Determine a jointly coded value corresponding to the rank and the value of the first codebook index, where the jointly coded value and the rank have a first correspondence, and the jointly coded value and the first codebook index have a second correspondence.

S24: Send the jointly coded value to a base station.

The precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6\}$, $\{1, 3, 5, 7\}$, $\{8, 10, 12, 14\}$, or $\{9, 11, 13, 15\}$.

Therefore, the method for transmitting a 4-antenna precoding matrix according to this embodiment may prevent a problem where precoding matrices are repeated after subsampling, thereby improving system performance and enhancing user experience.

In this embodiment, optionally, a value range of the first codebook index $i_1$ is $0 \le i_1 \le 15$, and a value range of the second codebook index $i_2$ is $0 \le i_2 \le L_2 - 1$, where $L_2$ is a positive integer. For example, a value range of $L_2$ is $1 \le L_2 \le 16$, that is, the value range of the second codebook index $i_2$ is, for example, $0 \le i_2 \le 15$.

In this embodiment, optionally, when the rank is determined to be 1, $W_2$ satisfies the following equation (5):

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\} \quad (5)$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of $4\times1$, where an $i^{th}$ element in $e_i$ is 1, all other elements are 0, and $i \in \{1, 2, 3, 4\}$; A is a constant.

In this embodiment, optionally, when the rank determined by the UE is 2, $W_2$ satisfies the following equation (6):

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), \quad (6)$$

$(e_2, e_2), (e_3, e_3), (e_4, e_4), (e_1, e_2), (e_2, e_3), (e_1, e_4), (e_2, e_4)\}$ where $e_i$ represents a column vector with a dimension of $4\times1$, an $i^{th}$ element in $e_i$ is 1, all other elements are 0, and $i \in \{1, 2, 3, 4\}$; B is a constant.

In this embodiment, optionally, when the rank is determined to be 2, $W_2$ satisfies the following equation (7):

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\} \quad (7)$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of $4\times1$, an $i^{th}$ element in $e_i$ is 1, all other elements are 0, and $i \in \{1, 2, 3, 4\}$; B is a constant.

That is, in this embodiment, when the user equipment determines that the rank used for indicating the number of transmission layers is 2, $W_2$ satisfies the equation (6) or $W_2$ satisfies the equation (7).

In this embodiment, if a 4-antenna codebook is transmitted in a submode 1 of a PUCCH mode 1-1, a solution used for jointly coding the rank RI and $i_1$ needs to be designed. When the rank is 2, the 4-antenna codebook that is determined according to Table B1 (corresponding to the equation (6)) or Table B2 (corresponding to the equation (7)) includes many repeated precoding matrices.

Specifically, for a solution (hereinafter referred to as solution 1 for short) represented by the equation (6) and a solution (hereinafter referred to as solution 2 for short) represented by the equation (7), $W_1$ satisfies the following equation:

$$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

and $q_1 = e^{j2\pi/32}$ ($n = 0, 1, \ldots, 15$)

Accordingly, four beam directions or column vectors included in $X_n$ and $X_{n+8}$ (in this case, $n = 0$ to 7) are the same. For example, when $$X_0 = \begin{bmatrix} 1 & 1 & 1 & 1 \\ e^{j2\pi \frac{0}{32}} & e^{j2\pi \frac{8}{32}} & e^{j2\pi \frac{16}{32}} & e^{j2\pi \frac{24}{32}} \end{bmatrix}$$

and $$X_8 = \begin{bmatrix} 1 & 1 & 1 & 1 \\ e^{j2\pi \frac{8}{32}} & e^{j2\pi \frac{16}{32}} & e^{j2\pi \frac{24}{32}} & e^{j2\pi \frac{0}{32}} \end{bmatrix},$$

it is obvious that beam directions or column vectors included in $X_0$ and $X_8$ are the same, and only sequences of the column vectors are different. As a result, some code words are repeated in a codebook generated based on $W=W_1 \cdot W_2$ when the rank is 2. The problem where some code words are repeated exists in both solution 1 and solution 2.

As an example, for both solution 1 and solution 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\},$$

where $(Y_1, Y_2)=(e_i, e_k) \in \{(e_1,e_1),(e_2,e_2),(e_3,e_3),(e_4,e_4)\}$, $e_i$ and $e_k$ represent one column vector with a dimension of 4×1, an $i^{th}$ element in $e_i$ is 1, and all other elements are 0.

When n=0 and $(Y_1, Y_2)=(e_2,e_2)$, $$W = W_1 \cdot W_2 = \frac{1}{B}\begin{bmatrix} X_n & 0 \\ 0 & X_n \end{bmatrix} \cdot \begin{bmatrix} Y_1 & Y_2 \\ Y_1 & -Y_2 \end{bmatrix} = \begin{bmatrix} 1 & 1 \\ e^{j2\pi\frac{8}{32}} & e^{j2\pi\frac{8}{32}} \\ \left(\frac{1}{e^{j2\pi\frac{8}{32}}}\right) & -\left(\frac{1}{e^{j2\pi\frac{8}{32}}}\right) \end{bmatrix};$$

and
when n=8 and $(Y_1, Y_2)=(e_1,e_1)$, $$W = W_1 \cdot W_2 = \frac{1}{B}\begin{bmatrix} X_n & 0 \\ 0 & X_n \end{bmatrix} \cdot \begin{bmatrix} Y_1 & Y_2 \\ Y_1 & -Y_2 \end{bmatrix} = \begin{bmatrix} 1 & 1 \\ e^{j2\pi\frac{8}{32}} & e^{j2\pi\frac{8}{32}} \\ \left(\frac{1}{e^{j2\pi\frac{8}{32}}}\right) & -\left(\frac{1}{e^{j2\pi\frac{8}{32}}}\right) \end{bmatrix}.$$

It is obvious that two code words represented when n is equal to 0 and n is equal to 8 are identical. A large amount of repeated code words may reduce efficiency of the codebook, so that system performance deteriorates. Therefore, when subsampling is performed on the codebook, it is required that the codebook after the subsampling is performed should not include repeated code words or repeated precoding matrices. It should be understood that the foregoing analysis is not limited to this embodiment.

In R12, a 4-antenna codebook whose rank is 3 or 4 is a codebook in R8. Therefore, with respect to a codebook whose rank is 3 or 4, $W_1$ corresponding to $i_1$ is an identity matrix and does not need to be represented by a bit. When the rank and the PMI of the precoding matrix are transmitted in the submode 1 of the PUCCH mode 1-1, the rank and $i_1$ are jointly coded, and subsampling is performed on $i_1$; however, subsampling is not performed on $i_2$ in this case.

With respect to a codebook whose rank is 2, if $i_1$ is represented by three bits after subsampling, it is required that a value range of n in $X_n$ corresponding to $i_1$ on which the subsampling is performed is 0-7 or 8-15, and it is not required that the value range of n is 0, 2, 4, 6, 8, 10, 12, 14 or 1, 3, 5, 7, 9, 11, 13, 15. This may prevent occurrence of repeated matrices. Moreover, with respect to a codebook whose rank is 1, the value range of n in $X_n$ is 0-7 or 8-15 and may include all directions, so as to be the same as the value range in a situation in which the rank is 2.

With respect to a codebook whose rank is 1 or 2, if four states of $i_1$ are represented by two bits after subsampling is performed on $i_1$, a total of PUCCH resources of three bits are required to represent a precoding matrix. In this case, it is required that n in $X_n$ corresponding to $i_1$ after the subsampling is performed is (0, 2, 4, 6), (1, 3, 5, 7), (8, 10, 12, 14), or (9, 11, 13, 15). In this case, for all vectors in $X_n$ space and beam directions may be divided evenly.

In addition, with respect to the codebook whose rank is 1 or 2, if the number of states after the subsampling is performed on $i_1$ is not 2 raised to the power of x (x is an integer), it should be prevented as much as possible that n and n+8 corresponding to $i_1$ concurrently exist. For example, when the number Z of states after the subsampling is performed on $i_1$ satisfies 8>Z>4 and Y is an integer, the value range of n is Z values in (0, 2, 4, 6, 8, 10, 12, 14) or Z values in (1, 3, 5, 7, 9, 11, 13, 15).

One vector $[1 \ q_1^x]^T$ in $X_n$ represents one direction, which may be represented by x, where x is an integer and a value range of x is 0 to 31. Because $q_1=e^{j2\pi/32}$, $q_1^x=q_1^{x+32}$. For example, when the value range of n is (0, 2, 4, 6), all directions (vectors) in $X_n$ are represented by x, which may be 16 directions: 0, 2, 4, 6, 8, 10, 12, 14, 16, 18, 20, 22, 24, 26, 28; therefore, space may be divided evenly.

Specifically, in this embodiment of the present invention, optionally, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

Optionally, in this embodiment, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and $i_1$ represents the first codebook index.

It should be understood that in this embodiment, when the rank is determined to be 1, the precoding matrices W included in the codebook set are determined according to Table A:

TABLE A

| $i_1$ | 0 | 1 | 2 | 3 |
|---|---|---|---|---|
| | | | $i_2$ | |
| 0-15 | $W_{i_1,0}^{(1)}$ | $W_{i_1,1}^{(1)}$ | $W_{i_1,2}^{(1)}$ | $W_{i_1,3}^{(1)}$ |

| $i_1$ | 4 | 5 | 6 | 7 |
|---|---|---|---|---|
| | | | $i_2$ | |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |

| $i_1$ | 8 | 9 | 10 | 11 |
|---|---|---|---|---|
| | | | $i_2$ | |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |

| $i_1$ | 12 | 13 | 14 | 15 |
|---|---|---|---|---|
| | | | $i_2$ | |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \quad e^{j2\pi m/32}],$$

$\varphi_k = e^{j\pi k/2}$, and m and k are nonnegative integers; $i_1$ represents the first codebook index; $i_2$ represents the second codebook index.

It should be further understood that in this embodiment, when the rank determined by the UE is 2, the precoding matrices W included in the codebook set are determined according to Table B1 or B2:

TABLE B1

| $i_1$ | 0 | 1 | 2 | 3 |
|---|---|---|---|---|
| | | | $i_2$ | |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | 4 | 5 | 6 | 7 |
|---|---|---|---|---|
| | | | $i_2$ | |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | 8 | 9 | 10 | 11 |
|---|---|---|---|---|
| | | | $i_2$ | |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | 12 | 13 | 14 | 15 |
|---|---|---|---|---|
| | | | $i_2$ | |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | 0 | 1 | 2 | 3 |
|---|---|---|---|---|
| | | | $i_2$ | |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

TABLE B2-continued

| $i_1$ | 4 | 5 | 6 | 7 |
|---|---|---|---|---|
| | | | $i_2$ | |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | 8 | 9 | 10 | 11 |
|---|---|---|---|---|
| | | | $i_2$ | |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |

| $i_1$ | 12 | 13 | 14 | 15 |
|---|---|---|---|---|
| | | | $i_2$ | |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$$v_m = [1 \quad e^{j2\pi m/32}], v_{m'} = [1 \quad e^{j2\pi m'/32}],$$

$\varphi_k = e^{j\pi k/2}$, and m, m', and k are nonnegative integers; $i_1$ represents the first codebook index; $i_2$ represents the second codebook index.

It should be understood that in this embodiment, the jointly coded value represents a value generated by performing joint coding on the rank and a first PMI, which is not described herein any further for brevity.

It should be further understood that sequence numbers of the foregoing processes do not mean execution sequences in various embodiments. The execution sequences of the processes should be determined according to functions and internal logic of the processes, and should not be construed as any limitation on the implementation processes of the embodiments.

Therefore, when a precoding matrix is transmitted in the submode 1 of the PUCCH mode 1-1, the method for transmitting a 4-antenna precoding matrix according to this embodiment of the present invention may prevent a problem where precoding matrices are repeated after subsampling, thereby improving system performance and enhancing user experience.

Figure 3:
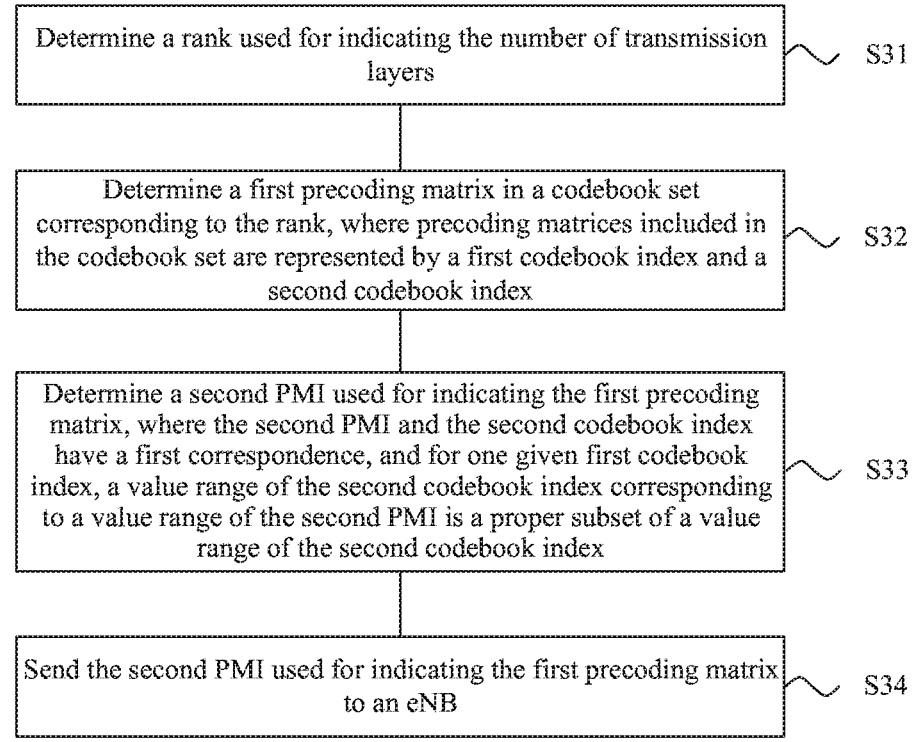
FIG. 3 is still another schematic flowchart of a method for transmitting a 4-antenna precoding matrix according to an embodiment.

FIG. 3 shows a schematic flowchart of a method 30 for transmitting a 4-antenna precoding matrix according to an embodiment. The method 30 may be performed, for example, by a user equipment. As shown in FIG. 3, the method 30 includes the following steps.

S31. Determine a rank used for indicating the number of transmission layers.

S32. Determine a first precoding matrix in a codebook set corresponding to the rank, where precoding matrices included in the codebook set are represented by a first codebook index and a second codebook index.

S33: Determine a second precoding matrix indicator PMI used for indicating the first precoding matrix, where the second PMI and the second codebook index have a first correspondence, and for one given first codebook index, a value range of the second codebook index corresponding to a value range of the second PMI is a proper subset of a value range of the second codebook index.

S34: Send the second PMI used for indicating the first precoding matrix to a base station.

The precoding matrices W included in the codebook set satisfy the following equation:

$W=W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15;

the first codebook index corresponds to one value of n, and a value range of n is a set {0, 1, 2, 3, 4, 5, 6, 7, 8, 9, 10, 11, 12, 13, 14, 15}; and when the rank is determined to be 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and a∈{0, 1, 2, 3, 4, 5, 6, 7}.

In a case that a precoding matrix is transmitted in a PUCCH mode 2-1, when the rank is 1, subsampling is not performed on a codebook; when the rank is 2, the subsampling is not performed on the first codebook index, but the subsampling is performed on the second codebook index, and the second codebook index is represented not by the original four bits, but by two bits after the subsampling.

Therefore, the method for transmitting a 4-antenna precoding matrix according to this embodiment of the present invention may prevent a problem where precoding matrices are repeated after subsampling, thereby improving system performance and enhancing user experience.

In this embodiment, optionally, a value range of the first codebook index $i_1$ is $0 \leq i_1 \leq 15$, and a value range of the second codebook index $i_2$ is $0 \leq i_2 \leq L_2-1$, where $L_2$ is a positive integer. For example, a value range of $L_2$ is $1 \leq L_2 \leq 16$, that is, the value range of the second codebook index $i_2$ is, for example, $0 \leq i_2 \leq 15$.

In this embodiment, optionally, when the rank is determined to be 1, $W_2$ satisfies the following equation (5):

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\} \quad (5)$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and i∈{1, 2, 3, 4}; A is a constant.

In this embodiment, optionally, when the rank determined by the UE is 2, $W_2$ satisfies the following equation (6):

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1),$$

$(e_2, e_2), (e_3, e_3), (e_4, e_4), (e_1, e_2), (e_2, e_3), (e_1, e_4), (e_2, e_4)\}$ where $e_i$ represents a column vector with a dimension of 4×1, an $i^{th}$ element in $e_i$ is 1, all other elements are 0, and i∈{1, 2, 3, 4}; B is a constant.

In this embodiment, optionally, when the rank is determined to be 2, $W_2$ satisfies the following equation (7):

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\} \quad (7)$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and i∈{1, 2, 3, 4}; B is a constant.

That is, in this embodiment, when the user equipment determines that the rank used for indicating the number of transmission layers is 2, $W_2$ satisfies the equation (6) or $W_2$ satisfies the equation (7).

In this embodiment, in order to prevent a problem where code words are overlapped, optionally, when the rank is determined to be 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

Therefore, by means of the method for transmitting a 4-antenna precoding matrix according to this embodiment, more precoding matrices that are applicable to a uniform linear array antenna may be indicated without changing a feedback mode or feedback bits, and it may also be ensured that performance for application of a dual-polarized antenna is not affected, and the problem where code words are overlapped after subsampling may be prevented, so that system performance may be improved and user experience may be enhanced.

In this embodiment, optionally, when the rank is determined to be 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

Specifically, when the rank is determined to be 3 or 4 and the precoding matrices included in the codebook set corresponding to the rank are the four precoding matrices with the codebook indexes 0 to 3 or 4 to 7 in Table G, if rank fallback is performed and the rank falls back to the rank 1, four uniform DFT vectors may be obtained. These DFT vectors are applicable to a ULA antenna, and the four DFT vectors are also applicable to a dual-polarized antenna.

When the rank is determined to be 3 or 4 and the precoding matrices included in the codebook set corresponding to the rank are the four precoding matrices with the codebook indexes 12 to 15 in Table G, the four precoding matrices are open-loop precoding matrices, and the four precoding matrices have a large chordal distance.

It should be understood that in this embodiment, when the rank is determined to be 1, the precoding matrices W included in the codebook set are determined according to Table A:

TABLE A

| $i_1$ | $i_2$ 0 | 1 | 2 | 3 |
|---|---|---|---|---|
| 0-15 | $W_{i_1,0}^{(1)}$ | $W_{i_1,1}^{(1)}$ | $W_{i_1,2}^{(1)}$ | $W_{i_1,3}^{(1)}$ |

| $i_1$ | $i_2$ 4 | 5 | 6 | 7 |
|---|---|---|---|---|
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |

| $i_1$ | $i_2$ 8 | 9 | 10 | 11 |
|---|---|---|---|---|
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |

| $i_1$ | $i_2$ 12 | 13 | 14 | 15 |
|---|---|---|---|---|
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix},\ \gamma(m) = e^{j2\pi\frac{(m-i_1)/4}{32}},\ v_m = [1\ \ e^{j2\pi m/32}],$$

$\varphi_k = e^{j\pi k/2}$, and m and k are nonnegative integers; $i_1$ represents the first codebook index; $i_2$ represents the second codebook index.

It should be further understood that in this embodiment, when the rank determined by the UE is 2, the precoding matrices W included in the codebook set are determined according to Table B1 or B2:

TABLE B1

| $i_1$ | $i_2$ 0 | 1 | 2 | 3 |
|---|---|---|---|---|
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ 4 | 5 | 6 | 7 |
|---|---|---|---|---|
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ 8 | 9 | 10 | 11 |
|---|---|---|---|---|
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ 12 | 13 | 14 | 15 |
|---|---|---|---|---|
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ 0 | 1 | 2 | 3 |
|---|---|---|---|---|
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

TABLE B2-continued

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $\check{W}_{i_1+8,i_1+24,0}^{(2)}$ | $W_{i_1+8,i_1+24,0}^{(2)}$ | $W_{i_1+8,i_1+24,2}^{(2)}$ | $\check{W}_{i_1+8,i_1+24,2}^{(2)}$ |

| $i_1$ | $i_2$ | | | |
|---|---|---|---|---|
| | 12 | 13 | 14 | 15 |
| 0-15 | $\tilde{W}_{i_1,i_1+16,0}^{(2)}$ | $\tilde{W}_{i_1+8,i_1+24,0}^{(2)}$ | $\tilde{W}_{i_1+16,i_1,0}^{(2)}$ | $\tilde{W}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\check{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$$v_m = [1 \; e^{j2\pi m/32}], v_{m'} = [1 \; e^{j2\pi m'/32}],$$

$\varphi_k = e^{j\pi k/2}$, and k are nonnegative integers; $i_1$ represents the first codebook index; $i_2$ represents the second codebook index.

It should be further understood that sequence numbers of the foregoing processes do not mean execution sequences in various embodiments. The execution sequences of the processes should be determined according to functions and internal logic of the processes, and should not be construed as any limitation on the implementation processes of the embodiments.

Therefore, when a precoding matrix is transmitted in the PUCCH mode 2-1, the method for transmitting a 4-antenna precoding matrix according to this embodiment may prevent a problem where precoding matrices are repeated after subsampling, thereby improving system performance and enhancing user experience.

The methods for transmitting a 4-antenna precoding matrix according to the embodiments are described in detail above based on a user equipment with reference to FIG. 1 to FIG. 3. The following describes methods for transmitting a 4-antenna precoding matrix according to the embodiments based on a base station with reference to FIG. 4 to FIG. 6.

Figure 4:
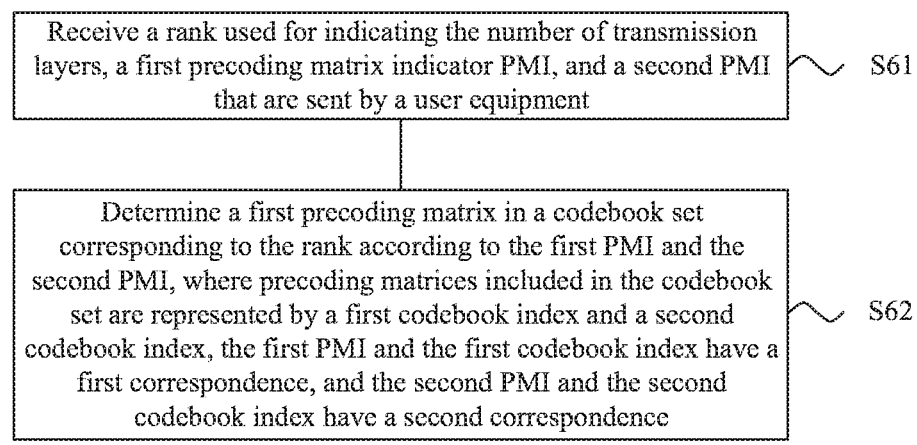
FIG. 4 is a schematic flowchart of a method for transmitting a 4-antenna precoding matrix according to another embodiment.

As shown in FIG. 4, a method 60 for transmitting a 4-antenna precoding matrix according to an embodiment may be performed by as base station. The method 60 includes the following steps.

S61: Receive a rank used for indicating the number of transmission layers, a first precoding matrix indicator PMI, and a second PMI that are sent by a user equipment.

S62: Determine a first precoding matrix in a codebook set corresponding to the rank according to the first PMI and the second PMI, where precoding matrices included in the codebook set are represented by a first codebook index and a second codebook index, the first PMI and the first codebook index have a first correspondence, and the second PMI and the second codebook index have a second correspondence.

The precoding matrices W included in the codebook set satisfy the following equation:

$W=W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6, 8, 10, 12, 14}, or {1, 3, 5, 7, 9, 11, 13, 15}.

Therefore, by means of the method for transmitting a 4-antenna precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

It should be understood that in this embodiment, the base station may receive, by means of CSI information sent by the UE, the PMI sent by the UE, where the CSI information may further include an RI, a CQI, and the like. The base station may obtain, according to the RI and the PMI, the precoding matrix fed back by the UE, and may obtain, according to the CQI, channel quality when the precoding matrix is used. When the base station performs single-user MIMO transmission for the UE, the base station may perform precoding on downlink data of the UE by using the precoding matrix, and may determine, according to the CQI, a modulation and coding scheme for sending the downlink data. When the base station performs multi-user MIMO transmission for the UE, for example, multi-user MIMO for two users, the base station may obtain, according to the precoding matrix fed back by the UE and a precoding matrix fed back by a pairing UE and by using a zero forcing ("ZF" for short) method, a precoding matrix that eliminates multi-user interference. Therefore, the eNB may perform precoding on the downlink data of the multi-user MIMO by using the precoding matrix; moreover, the base station may determine, according to CQIs fed back by the two users, a modulation and coding scheme for performing the multi-user MIMO transmission for the two users, which is not described herein any further for brevity.

In this embodiment, optionally, when the received rank is 1, $W_2$ satisfies the following equation:

$$W_2 \in \left\{\frac{1}{A}\begin{bmatrix} Y \\ \alpha(i)Y \end{bmatrix}, \frac{1}{A}\begin{bmatrix} Y \\ j\alpha(i)T \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix}\right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank is determined to be 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| | $i_2$ | | | |
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \ e^{j2\pi m/32}],$$

$\phi_k = e^{j\pi k/2}$, and m and k are nonnegative integers; $i_1$ represents the first codebook index; $i_2$ represents the second codebook index.

In this embodiment, optionally, when the rank determined by the UE is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}(Y_1, Y_2) \in$$

$$\{(e_1, e_1), (e_2, e_2), (e_3, e_3), (e_4, e_4), (e_1, e_2), (e_2, e_3), (e_1, e_4), (e_2, e_4)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the rank is determined to be 2, $W_2$ satisfies the following equation:

$W_2 \in$ $$\left\{\frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix}\right\}(Y_1, Y_2) \in$$

$$\{(e_2, e_4)\}$$

$$W_2 \in \left\{\frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix}\right\}(Y_1, Y_2) \in$$

$$\{(e_1, e_1), (e_2, e_2), (e_3, e_3), (e_4, e_4)\}$$

$$W_2 \in \left\{\frac{1}{B}\begin{bmatrix} Y_1 & Y_2 \\ Y_2 & -Y_1 \end{bmatrix}\right\}(Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the rank determined by the UE is 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| | $i_2$ | | | |
| $i_1$ | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$v_m = [1 \ e^{j2\pi m/32}], v_{m'} = [1 \ e^{j2\pi m'/32}],$ $\phi_k = e^{j\pi k/2}$, and m, m', and k are nonnegative integers; $i_1$ represents the first codebook index; $i_2$ represents the second codebook index.

In this embodiment, optionally, when the received rank is 2, the value range of n may be the set $\{0, 1, 2, 3, 4, 5, 6, 7\}$ or $\{8, 9, 10, 11, 12, 13, 14, 15\}$.

In this embodiment, optionally, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

It should be understood that in this embodiment, "mod" represents a modulo operation.

Therefore, by means of the method for transmitting a 4-antenna precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes the value range of the second codebook index corresponding to the second PMI is uniquely determined according to a value and/or the value range of the first codebook index corresponding to the first PMI.

In this embodiment, optionally, that a value range of the first codebook index corresponding to the first PMI and a value range of the second codebook index corresponding to the second PMI have an association relationship includes the value range of the first codebook index corresponding to the first PMI includes at least two first value sets having different elements, the value range of the second codebook index corresponding to the second PMI includes at least two second value sets having different elements, and the at least two first value sets and the at least two second value sets having a one-to-one correspondence.

It should be understood that the number of the first value sets is equal to the number of the second value sets. It should be further understood that the elements in the first value sets are different from each other, and the elements in the second value sets are also different from each other.

Optionally, each first value set of the at least two first value sets includes at least two values, and each second value set of the at least two second value sets includes at least two values.

In this embodiment, the value range of the first codebook index corresponding to the first PMI and the value range of the second codebook index corresponding to the second PMI have an association relationship; therefore, by means of the method for transmitting a precoding matrix according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

In this embodiment, optionally, when the rank is determined to be 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |

TABLE C4-continued

| $I_{PMI1}$ | $i_1 = 2I_{PMI1} + 1$ | $I_{PMI2}$ | $i_2$ |
|---|---|---|---|
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

It should be understood that interaction and related features and functions of the base station and the user equipment that are described on the base station side correspond to the description on the user equipment side with reference to FIG. 1, which are not described herein any further for brevity.

It should be further understood that sequence numbers of the foregoing processes do not mean execution sequences in various embodiments. The execution sequences of the processes should be determined according to functions and internal logic of the processes, and should not be construed as any limitation on the implementation processes of the embodiments.

Therefore, in the method for transmitting a 4-antenna precoding matrix according to this embodiment, the value range of the first codebook index corresponding to the first PMI and the value range of the second codebook index corresponding to the second PMI have an association relationship, so that more precoding matrices that are applicable to a uniform linear array antenna may be indicated during codebook subsampling without changing a feedback mode or feedback bits, and each precoding matrix in a codebook set after the subsampling is applicable to a dual-polarized antenna, which may ensure that performance for application of the dual-polarized antenna is not affected, improve system performance and enhance user experience.

Figure 5:
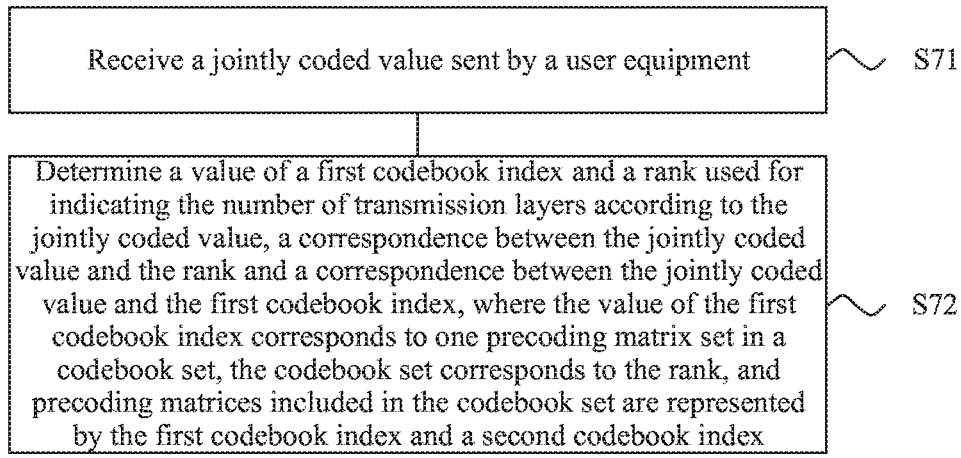
FIG. 5 is another schematic flowchart of a method for transmitting a 4-antenna precoding matrix according to another embodiment.

FIG. 5 shows a schematic flowchart of a method 70 for transmitting a 4-antenna precoding matrix according to an embodiment. The method 70 may be performed, for example, by a base station. As shown in FIG. 5, the method 70 includes the following steps.

S71: Receive a jointly coded value sent by a user equipment.

S72: Determine a value of a first codebook index and a rank used for indicating the number of transmission layers according to the jointly coded value, a correspondence between the jointly coded value and the rank and a correspondence between the jointly coded value and the first codebook index.

The value of the first codebook index corresponds to one precoding matrix set in a codebook set, the codebook set corresponds to the rank, precoding matrices included in the codebook set are represented by the first codebook index and a second codebook index, and the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6\}$, $\{1, 3, 5, 7\}$, $\{8, 10, 12, 14\}$, or $\{9, 11, 13, 15\}$.

Therefore, the method for transmitting a 4-antenna precoding matrix according to this embodiment may prevent a problem where precoding matrices are repeated after sub-sampling, thereby improving system performance and enhancing user experience.

In this embodiment, optionally, when the rank is determined to be 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank is determined to be 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in \{(e_1, e_1), (e_2, e_2),$$

$$(e_3, e_3), (e_4, e_4), (e_1, e_2), (e_2, e_3), (e_1, e_4), (e_2, e_4)\}; \text{ or}$$

$$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$$(Y_1, Y_2) \in \{(e_2, e_4)\}$$

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$$\{(e_1, e_1), (e_2, e_2), (e_3, e_3), (e_4, e_4)\}$$

$$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

In this embodiment, optionally, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and $i_1$ represents the first codebook index.

It should be understood that in this embodiment, when the rank is determined to be 1, the precoding matrices W included in the codebook set are determined according to Table A:

TABLE A

| | $i_2$ | | | |
|---|---|---|---|---|
| $i_1$ | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| | $i_2$ | | | |
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi \frac{(m-i_1)/4}{32}}, v_m = [1 \quad e^{j2\pi m/32}],$$

$\varphi_k = e^{j\pi k/2}$, and m and k are nonnegative integers; $i_1$ represents the first codebook index; $i_2$ represents the second codebook index.

It should be further understood that in this embodiment, when the rank determined by the UE is 2, the precoding matrices W included in the codebook set are determined according to Table B1 or B2:

TABLE B1

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

TABLE B1-continued

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| | $i_2$ | | | |
| $i_1$ | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix},$$

$v_m = [1 \quad e^{j2\pi m/32}], v_{m'} = [1 \quad e^{j2\pi m'/32}],$ $\varphi_k = e^{j\pi k/2}$, and m, m', and k are nonnegative integers; $i_1$ represents the first codebook index; $i_2$ represents the second codebook index.

It should be understood that in this embodiment, the jointly coded value represents a value generated by performing joint coding on the rank and a first PMI, which is not described herein any further for brevity.

It should be understood that interaction and related features and functions of the base station and the user equipment that are described on the base station side correspond to the description on the user equipment side with reference to FIG. 2, which are not described herein any further for brevity.

It should be further understood that sequence numbers of the foregoing processes do not mean execution sequences in various embodiments. The execution sequences of the processes should be determined according to functions and internal logic of the processes, and should not be construed as any limitation on the implementation processes of the embodiments.

Therefore, the method for transmitting a 4-antenna precoding matrix according to this embodiment of the present invention may prevent a problem where precoding matrices are repeated after subsampling, thereby improving system performance and enhancing user experience.

Figure 6:
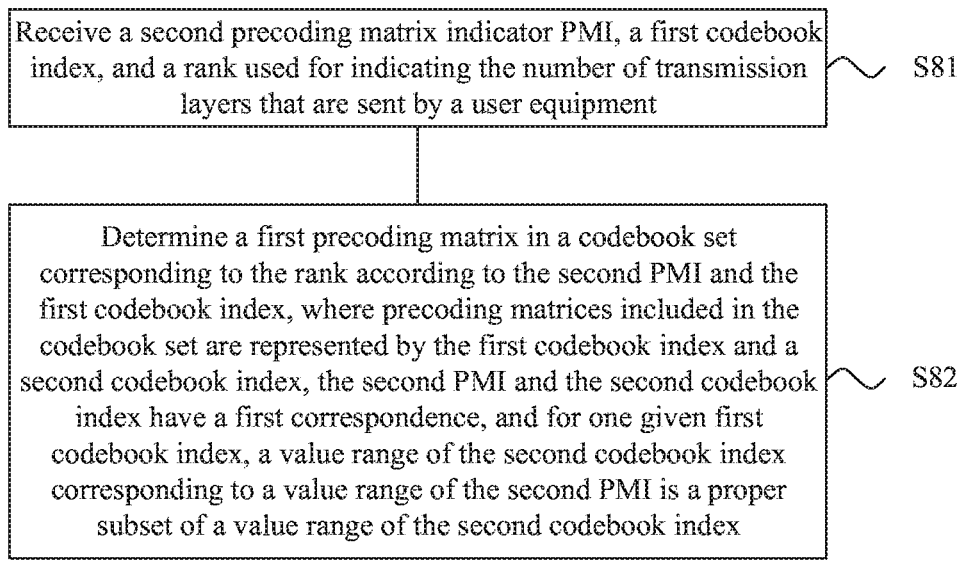
FIG. 6 is still another schematic flowchart of a method for transmitting a 4-antenna precoding matrix according to another embodiment.

FIG. 6 shows a schematic flowchart of a method 80 for transmitting a 4-antenna precoding matrix according to an embodiment. The method 80 may be performed, for example, by a base station. As shown in FIG. 6, the method 80 includes the following steps.

S81: Receive a second precoding matrix indicator PMI, a first codebook index, and a rank used for indicating the number of transmission layers that are sent by a user equipment.

S82: Determine a first precoding matrix in a codebook set corresponding to the rank according to the second PMI and the first codebook index, where precoding matrices included in the codebook set are represented by the first codebook index and a second codebook index, the second PMI and the second codebook index have a first correspondence, and for one given first codebook index, a value range of the second codebook index corresponding to a value range of the second PMI is a proper subset of a value range of the second codebook index.

The precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$;

the first codebook index corresponds to one value of n, and a value range of n is a set $\{0, 1, 2, 3, 4, 5, 6, 7, 8, 9, 11, 12, 13, 14, 15\}$; and when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and $a \in \{0, 1, 2, 3, 4, 5, 6, 7\}$.

Therefore, the method for transmitting a 4-antenna precoding matrix according to this embodiment may prevent a problem where precoding matrices are repeated after subsampling, thereby improving system performance and enhancing user experience.

In this embodiment, optionally, a value range of the first codebook index $i_1$ is $0 \leq i_1 \leq 15$, and a value range of the second codebook index $i_2$ is $0 \leq i_2 \leq L_2-1$, where $L_2$ is a positive integer. For example, a value range of $L_2$ is $1 \leq L_2 \leq 16$, that is, the value range of the second codebook index $i_2$ is, for example, $0 \leq i_2 \leq 15$.

In this embodiment, optionally, when the received rank is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of $4 \times 1$, where an $i^{th}$ element in $e_i$ is 1, all other elements are 0, and $i \in \{1, 2, 3, 4\}$; A is a constant.

In this embodiment, optionally, when the received rank is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of $4 \times 1$, an $i^{th}$ element in $e_i$ is 1, all other elements are 0, and $i \in \{1, 2, 3, 4\}$; B is a constant.

In this embodiment, optionally, when the received rank is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

It should be understood that in this embodiment, when the rank is determined to be 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| | $i_2$ | | | |
| $i_1$ | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| | $i_2$ | | | |
| $i_1$ | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| | $i_2$ | | | |
| $i_1$ | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v_m \\ \varphi_k \gamma(m) v_m \end{bmatrix}, \gamma(m) = e^{j2\pi\frac{(m-i_1)/4}{32}}, v_m = [1 \ e^{j2\pi m/32}],$$

$\varphi_k = e^{j\pi k/2}$, and m and k are nonnegative integers; $i_1$ represents the first codebook index; $i_2$ represents the second codebook index.

It should be further understood that in this embodiment, when the rank determined by the UE is 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| | $i_2$ | | | |
| $i_1$ | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_{m'} & -\varphi_k v_m \end{bmatrix}, v_m = [1 \ e^{j2\pi m/32}],$$

$v_{m'} = [1 \ e^{j2\pi m'/32}],$ $\varphi_k = e^{j\pi k/2}$, and m, m', and k are nonnegative integers; $i_1$ represents the first codebook index; $i_2$ represents the second codebook index.

In this embodiment, optionally, when the received rank is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |

TABLE G-continued

| Codebook Index | $u_n$ | RI 1 | RI 2 | RI 3 | RI 4 |
|---|---|---|---|---|---|
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set {s} of a matrix $W_n = I - 2u_n u_n^H / u_n^H u_n$, and I is a 4×4 identity matrix.

It should be understood that interaction and related features and functions of the base station and the user equipment that are described on the base station side correspond to the description on the user equipment side with reference to FIG. 3, which are not described herein any further for brevity.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, the method for transmitting a 4-antenna precoding matrix according to this embodiment may prevent a problem where precoding matrices are repeated after subsampling, thereby improving system performance and enhancing user experience.

The methods for transmitting a 4-antenna precoding matrix according to the embodiments are described in detail above with reference to FIG. 1 to FIG. 6. The following describes a user equipment and a base station according to the embodiments in detail with reference to FIG. 7 to FIG. 18.

FIG. 7 shows a schematic block diagram of a user equipment 100 according to an embodiment. As shown in FIG. 7, the user equipment 100 includes: a determining module 110, configured to determine a rank used for indicating the number of transmission layers, further configured to determine a first precoding matrix in a codebook set corresponding to the rank, where precoding matrices included in the codebook set are represented by a first codebook index and a second codebook index, and further configured to determine a first precoding matrix indicator PMI and a second PMI used for indicating the first precoding matrix, where the first PMI and the first codebook index have a first correspondence, and the second PMI and the second codebook index have a second correspondence; and a sending module 120, configured to send, to a base station, the first PMI and the second PMI that are used for indicating the first precoding matrix and determined by the determining module 110, where:

the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6, 8, 10, 12, 14}, or {1, 3, 5, 7, 9, 11, 13, 15}.

Therefore, by means of the user equipment according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

In this embodiment, optionally, a value range of the first codebook index $i_1$ is $0 \leq i_1 \leq 15$, and a value range of the second codebook index $i_2$ is $0 \leq i_2 \leq L_2 - 1$, where $L_2$ is a positive integer. For example, a value range of $L_2$ is $1 \leq L_2 \leq 16$, that is, the value range of the second codebook index $i_2$ is, for example, $0 \leq i_2 \leq 15$.

In this embodiment, optionally, when the rank determined by the determining module 110 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank determined by the determining module 110 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

-continued $(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\};$ or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$ where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

In this embodiment, optionally, when the rank determined by the determining module 110 is 1, the precoding matrices W included in the codebook set are determined according to Table A:

TABLE A

| $i_1$ | $i_2$ | | | |
|---|---|---|---|---|
| | 0 | 1 | 2 | 3 |
| 0-15 | $W_{i_1,0}^{(1)}$ | $W_{i_1,1}^{(1)}$ | $W_{i_1,2}^{(1)}$ | $W_{i_1,3}^{(1)}$ |
| $i_1$ | $i_2$ | | | |
| | 4 | 5 | 6 | 7 |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |
| $i_1$ | $i_2$ | | | |
| | 8 | 9 | 10 | 11 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |
| $i_1$ | $i_2$ | | | |
| | 12 | 13 | 14 | 15 |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v \\ \varphi_k \gamma(m) v_m \end{bmatrix}, \gamma(m) = e^{j2\pi\frac{(m-i_1)/4}{32}}, v_m = [1 \quad e^{j2\pi m/32}],$$

$\varphi_k = e^{j\pi k/2}$, and m and k are nonnegative integers; $i_1$ represents the first codebook index; $i_2$ represents the second codebook index.

In this embodiment, optionally, when the rank determined by the determining module 110 is 2, the precoding matrices W included in the codebook set are determined according to Table B1 or B2:

TABLE B1

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | $i_2$ | | | |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | $i_2$ | | | |
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| $i_1$ | $i_2$ | | | |
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

TABLE B2

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | $i_2$ | | | |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | $i_2$ | | | |
| | 8 | 9 | 10 | 11 |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |
| $i_1$ | $i_2$ | | | |
| | 12 | 13 | 14 | 15 |
| 0-15 | $\tilde{\tilde{W}}_{i_1,i_1+16,0}^{(2)}$ | $\tilde{\tilde{W}}_{i_1+8,i_1+24,0}^{(2)}$ | $\tilde{\tilde{W}}_{i_1+16,i_1,0}^{(2)}$ | $\tilde{\tilde{W}}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

$$\tilde{\tilde{W}}_{m,m',k}^{(2)} = \frac{1}{\sqrt{8}}\begin{bmatrix} v_m & v_{m'} \\ \varphi_k v_m & -\varphi_k v_{m'} \end{bmatrix}, v_m = [1 \quad e^{j2\pi m/32}],$$

$v_{m'} = [1 \quad e^{j2\pi m'/32}],$ $\varphi_k = e^{j\pi k/2}$, and m, m', and k are nonnegative integers; $i_1$ represents the first codebook index; $i_2$ represents the second codebook index.

In this embodiment, optionally, when the rank determined by the determining module 110 is 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

In this embodiment, optionally, when the rank determined by the determining module 110 is 2, the value range of n may be the set {0, 1, 2, 3, 4, 5, 6, 7} or {8, 9, 10, 11, 12, 13, 14, 15}.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the user equipment 100 according to this embodiment may correspond to a user equipment that performs a method for transmitting a 4-antenna precoding matrix according to an embodiment of the present invention, and the foregoing and other operations and/or functions of modules in the user equipment 100 are used to implement a corresponding procedure of the method in FIG. 1, which is not described herein any further for brevity.

Therefore, by means of the user equipment according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Figure 8:
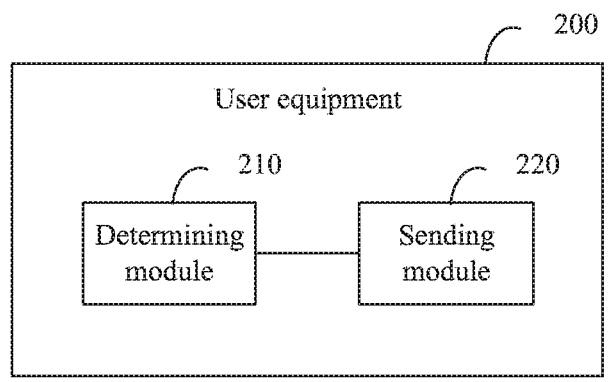
FIG. 8 is another schematic block diagram of a user equipment according to an embodiment.

FIG. 8 shows a schematic block diagram of a user equipment 200 according to an embodiment. As shown in FIG. 8, the user equipment 200 includes: a determining module 210, configured to determine a rank used for indicating the number of transmission layers, further configured to determine a value of a first codebook index corresponding to one precoding matrix set in a codebook set, where the codebook set corresponds to the rank, and precoding matrices included in the codebook set are represented by the first codebook index and a second codebook index, and further configured to determine a jointly coded value corresponding to the rank and the value of the first codebook index, where the jointly coded value and the rank have a first correspondence, and the jointly coded value and the first codebook index have a second correspondence; and a sending module 220, configured to send the jointly coded value determined by the determining module 210 to a base station, where:
the precoding matrices W included in the codebook set satisfy the following equation:
$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and
the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

Therefore, the user equipment according to this embodiment may prevent a problem where precoding matrices are repeated after subsampling, thereby improving system performance and enhancing user experience.

In this embodiment, optionally, when the rank determined by the determining module 210 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank determined by the determining module 210 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$
$(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\}, (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the number of bits bearing the jointly coded value is 4, the correspondence between the jointly coded value and the rank and the correspondence between the jointly coded value and the first codebook index are determined according to the following Table D:

TABLE D

| $I_{RI/PMI_1}$ | RI | $i_1$ |
|---|---|---|
| 0-7 | 1 | $I_{RI/PMI_1}$ |
| 8-15 | 2 | $I_{RI/PMI_1} - 8$ | where $I_{RI/PMI_1}$ represents the jointly coded value, RI represents the rank, and $i_1$ represents the first codebook index.

In this embodiment, optionally, when the number of bits bearing the jointly coded value is 3, the correspondence between the jointly coded value and the rank and the correspondence between the jointly coded value and the first codebook index are determined according to the following Table E:

TABLE E

| $I_{RI/PMI_1}$ | RI | $i_1$ |
|---|---|---|
| 0-3 | 1 | $2 \times I_{RI/PMI_1}$ |
| 4-7 | 2 | $2 \times (I_{RI/PMI_1} - 4)$ | where $I_{RI/PMI_1}$ represents the jointly coded value, RI represents the rank, and $i_1$ represents the first codebook index.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and a value range of the second codebook index corresponding to a second PMI have an association relationship. Optionally, that a value range of the first codebook index corresponding to the first PMI and a value range of the second codebook index corresponding to a second PMI have an association relationship includes the value range of the second codebook index corresponding to the second PMI is uniquely determined according to a value and/or the value range of the first codebook index corresponding to the first PMI.

It should be understood that the user equipment 200 according to this embodiment may correspond to a user equipment that performs a method for transmitting a 4-antenna precoding matrix according to an embodiment, and the foregoing and other operations and/or functions of modules in the user equipment 200 are used to implement a corresponding procedure of the method in FIG. 2, which is not described herein any further for brevity.

Therefore, the user equipment according to this embodiment may prevent a problem where precoding matrices are repeated after subsampling, thereby improving system performance and enhancing user experience.

Figure 9:
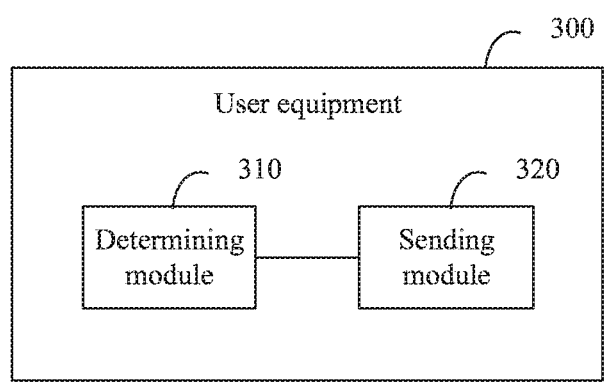
FIG. 9 is still another schematic block diagram of a user equipment according to an embodiment.

FIG. 9 shows a schematic block diagram of a user equipment 300 according to an embodiment. As shown in FIG. 9, the user equipment 300 includes: a determining module 310, configured to determine a rank used for indicating the number of transmission layers, further configured to determine a first precoding matrix in a codebook set corresponding to the rank, where precoding matrices included in the codebook set are represented by a first codebook index and a second codebook index, and further configured to determine a second precoding matrix indicator PMI used for indicating the first precoding matrix, where the second PMI and the second codebook index have a first correspondence, and for one given first codebook index, a value range of the second codebook index corresponding to a value range of the second PMI is a proper subset of a value range of the second codebook index; and a sending module 320, configured to send, to a base station, the second PMI that is used for indicating the first precoding matrix and determined by the determining module 310, where:

the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15;

the first codebook index corresponds to one value of n, and a value range of n is a set {0, 1, 2, 3, 4, 5, 6, 7, 8, 9, 10, 11, 12, 13, 14, 15}; and when the rank determined by the determining module 310 is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and a∈{0, 1, 2, 3, 4, 5, 6, 7}.

Therefore, the user equipment according to this embodiment may prevent a problem where precoding matrices are repeated after subsampling, thereby improving system performance and enhancing user experience.

In this embodiment, optionally, when the rank determined by the determining module 310 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and i∈{1, 2, 3, 4}; A is a constant.

In this embodiment, optionally, when the rank determined by the determining module 310 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and i∈{1, 2, 3, 4}; B is a constant.

In this embodiment, optionally, when the rank determined by the determining module 310 is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

In this embodiment, optionally, when the rank determined by the determining module 310 is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | 2 | 3 | 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and the value range of the second codebook index corresponding to the second PMI have an association relationship. Optionally, that a value range of the first codebook index corresponding to the first PMI and the value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the user equipment 300 according to this embodiment may correspond to a user equipment that performs a method for transmitting a 4-antenna precoding matrix according to an embodiment, and the foregoing and other operations and/or functions of modules in the user equipment 300 are used to implement a corresponding procedure of the method in FIG. 3, which is not described herein any further for brevity.

Therefore, the user equipment according to this embodiment may prevent a problem where precoding matrices are repeated after subsampling, thereby improving system performance and enhancing user experience.

Figure 10:
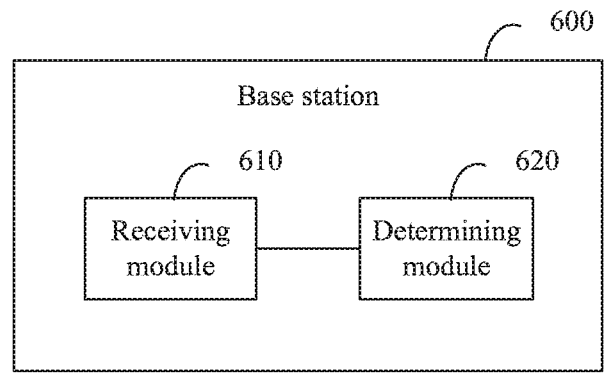
FIG. 10 is a schematic block diagram of a base station according to an embodiment.

FIG. 10 shows a schematic block diagram of a base station 600 according to an embodiment. As shown in FIG. 10, the base station 600 includes a receiving module 610, configured to receive a rank used for indicating the number of transmission layers, a first precoding matrix indicator PMI, and a second PMI that are sent by a user equipment. Also included is a determining module 620, configured to determine, according to the first PMI and the second PMI received by the receiving module 610, a first precoding matrix in a codebook set corresponding to the rank received by the receiving module 610, where precoding matrices included in the codebook set are represented by a first codebook index and a second codebook index, the first PMI and the first codebook index have a first correspondence, and the second PMI and the second codebook index have a second correspondence, where the precoding matrices W included in the codebook set satisfy the following equation: $W = W_1 \times W_2$, where $$W_1 = \begin{bmatrix} X_n & 0 \\ 0 & X_n \end{bmatrix},\ X_n = \begin{bmatrix} 1 & 1 & 1 & 1 \\ q_1^n & q_1^{n+8} & q_1^{n+16} & q_1^{n+24} \end{bmatrix},\ q_1 = e^{j2\pi/32},$$

and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

Therefore, by means of the base station according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

In this embodiment, optionally, a value range of the first codebook index $i_1$ is $0 \le i_1 \le 15$, and a value range of the second codebook index $i_2$ is $0 \le i_2 \le L_2 - 1$, where $L_2$ is a positive integer. For example, a value range of $L_2$ is $1 \le L_2 \le 16$, that is, the value range of the second codebook index $i_2$ is, for example, $0 \le i_2 \le 15$.

In this embodiment, optionally, when the rank received by the receiving module 610 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank received by the receiving module 610 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\}, (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4) + 1$, $\alpha(i) = q_1^{2(i-1)}$, and A is a constant.

In this embodiment, optionally, when the rank received by the receiving module 610 is 1, the precoding matrices W included in the codebook set are determined according to Table A:

TABLE A

| $i_1$ | 0 | 1 | 2 | 3 |
|---|---|---|---|---|
| | | | $i_2$ | |
| 0-15 | $W_{i_1,0}^{(1)}$ | $W_{i_1,1}^{(1)}$ | $W_{i_1,2}^{(1)}$ | $W_{i_1,3}^{(1)}$ |

| $i_1$ | 4 | 5 | 6 | 7 |
|---|---|---|---|---|
| | | | $i_2$ | |
| 0-15 | $W_{i_1+8,0}^{(1)}$ | $W_{i_1+8,1}^{(1)}$ | $W_{i_1+8,2}^{(1)}$ | $W_{i_1+8,3}^{(1)}$ |

| $i_1$ | 8 | 9 | 10 | 11 |
|---|---|---|---|---|
| | | | $i_2$ | |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ |

| $i_1$ | 12 | 13 | 14 | 15 |
|---|---|---|---|---|
| | | | $i_2$ | |
| 0-15 | $W_{i_1+24,0}^{(1)}$ | $W_{i_1+24,1}^{(1)}$ | $W_{i_1+24,2}^{(1)}$ | $W_{i_1+24,3}^{(1)}$ | where $$W_{m,k}^{(1)} = \frac{1}{2}\begin{bmatrix} v \\ \varphi_k \gamma(m) v_m \end{bmatrix}, \gamma(m) = e^{j2\pi \frac{(m-i_1)/4}{32}}, v_m = [\begin{array}{cc} 1 & e^{j2\pi m/32} \end{array}],$$

$\phi_k = e^{j\pi k/2}$, and m and k are nonnegative integers; $i_1$ represents the first codebook index; $i_2$ represents the second codebook index.

In this embodiment, optionally, when the rank received by the receiving module 610 is 2, the precoding matrices W included in the codebook set are determined according to Table B1 or B2:

TABLE B1

| $i_1$ | 0 | 1 | 2 | 3 |
|---|---|---|---|---|
| | | | $i_2$ | |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | 4 | 5 | 6 | 7 |
|---|---|---|---|---|
| | | | $i_2$ | |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | 8 | 9 | 10 | 11 |
|---|---|---|---|---|
| | | | $i_2$ | |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | 12 | 13 | 14 | 15 |
|---|---|---|---|---|
| | | | $i_2$ | |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

| $i_1$ | 0 | 1 | 2 | 3 |
|---|---|---|---|---|
| | | | $i_2$ | |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | 4 | 5 | 6 | 7 |
|---|---|---|---|---|
| | | | $i_2$ | |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | 8 | 9 | 10 | 11 |
|---|---|---|---|---|
| | | | $i_2$ | |
| 0-15 | $\tilde{W}_{i_1+8,i_1+24,0}^{(2)}$ | $W_{i_1+8,i_1+24,0}^{(2)}$ | $W_{i_1+8,i_1+24,2}^{(2)}$ | $\tilde{W}_{i_1+8,i_1+24,2}^{(2)}$ |

| $i_1$ | 12 | 13 | 14 | 15 |
|---|---|---|---|---|
| | | | $i_2$ | |
| 0-15 | $\tilde{W}_{i_1,i_1+16,0}^{(2)}$ | $\tilde{W}_{i_1+8,i_1+24,0}^{(2)}$ | $\tilde{W}_{i_1+16,i_1,0}^{(2)}$ | $\tilde{W}_{i_1+24,i_1+8,0}^{(2)}$ | where $$W_{m,m',k}^{(2)} = \frac{1}{\sqrt{8}}\begin{bmatrix} v_m & v_{m'} \\ \varphi_k v_m & -\varphi_k v_{m'} \end{bmatrix},$$

$$\tilde{W}_{m,m',k}^{(2)} = \frac{1}{\sqrt{8}}\begin{bmatrix} v_m & v_{m'} \\ \varphi_k v_m & \varphi_k v_{m'} \end{bmatrix},$$

-continued $$\tilde{W}^{(2)}_{m,m',k} = \frac{1}{\sqrt{8}} \begin{bmatrix} v_m & v_{m'} \\ \varphi_k v_{m'} & -\varphi_k v_m \end{bmatrix}, v_m = [1 \ e^{j2\pi m/32}],$$

$$v_{m'} = [1 \ e^{j2\pi m'/32}],$$

$\phi_k = e^{j\pi k/2}$, and m, m', and k are nonnegative integers; $i_1$ represents the first codebook index; $i_2$ represents the second codebook index.

In this embodiment, optionally, when the rank received by the receiving module 610 is 1, the first PMI, the second PMI, the first codebook index corresponding to the first PMI, and the second codebook index corresponding to the second PMI are determined according to Table C1, C2, C3, or C4:

TABLE C1

| $I_{PMI1}$ | $i_1 = I_{PMI1}$ | $I_{PMI2}$ | $i_2$ |
|---|---|---|---|
| 0 | 0 | 0 | 0 |
| 0 | 0 | 1 | 2 |
| 1 | 1 | 0 | 4 |
| 1 | 1 | 1 | 6 |
| 2 | 2 | 0 | 8 |
| 2 | 2 | 1 | 10 |
| 3 | 3 | 0 | 12 |
| 3 | 3 | 1 | 14 |
| 4 | 4 | 0 | 1 |
| 4 | 4 | 1 | 3 |
| 5 | 5 | 0 | 5 |
| 5 | 5 | 1 | 7 |
| 6 | 6 | 0 | 9 |
| 6 | 6 | 1 | 11 |
| 7 | 7 | 0 | 13 |
| 7 | 7 | 1 | 15 |

TABLE C2

| $I_{PMI1}$ | $i_1 = I_{PMI1} + 8$ | $I_{PMI2}$ | $i_2$ |
|---|---|---|---|
| 0 | 8 | 0 | 0 |
| 0 | 8 | 1 | 2 |
| 1 | 9 | 0 | 4 |
| 1 | 9 | 1 | 6 |
| 2 | 10 | 0 | 8 |
| 2 | 10 | 1 | 10 |
| 3 | 11 | 0 | 12 |
| 3 | 11 | 1 | 14 |
| 4 | 12 | 0 | 1 |
| 4 | 12 | 1 | 3 |
| 5 | 13 | 0 | 5 |
| 5 | 13 | 1 | 7 |
| 6 | 14 | 0 | 9 |
| 6 | 14 | 1 | 11 |
| 7 | 15 | 0 | 13 |
| 7 | 15 | 1 | 15 |

TABLE C3

| $I_{PMI1}$ | $i_1 = 2I_{PMI1}$ | $I_{PMI2}$ | $i_2$ |
|---|---|---|---|
| 0 | 0 | 0 | 0 |
| 0 | 0 | 1 | 2 |
| 1 | 2 | 0 | 8 |
| 1 | 2 | 1 | 10 |
| 2 | 4 | 0 | 1 |
| 2 | 4 | 1 | 3 |
| 3 | 6 | 0 | 9 |
| 3 | 6 | 1 | 11 |
| 4 | 8 | 0 | 0 |
| 4 | 8 | 1 | 2 |
| 5 | 10 | 0 | 8 |
| 5 | 10 | 1 | 10 |
| 6 | 12 | 0 | 1 |
| 6 | 12 | 1 | 3 |
| 7 | 14 | 0 | 9 |
| 7 | 14 | 1 | 11 |

TABLE C4

| $I_{PMI1}$ | $i_1 = 2I_{PMI1} + 1$ | $I_{PMI2}$ | $i_2$ |
|---|---|---|---|
| 0 | 1 | 0 | 4 |
| 0 | 1 | 1 | 6 |
| 1 | 3 | 0 | 12 |
| 1 | 3 | 1 | 14 |
| 2 | 5 | 0 | 5 |
| 2 | 5 | 1 | 7 |
| 3 | 7 | 0 | 13 |
| 3 | 7 | 1 | 15 |
| 4 | 9 | 0 | 4 |
| 4 | 9 | 1 | 6 |
| 5 | 11 | 0 | 12 |
| 5 | 11 | 1 | 14 |
| 6 | 13 | 0 | 5 |
| 6 | 13 | 1 | 7 |
| 7 | 15 | 0 | 13 |
| 7 | 15 | 1 | 15 | where $I_{PMI1}$ represents the first PMI, $I_{PMI2}$ represents the second PMI, $i_1$ represents the first codebook index, and $i_2$ represents the second codebook index.

In this embodiment, optionally, when the rank received by the receiving module 610 is 2, the value range of n may be the set {0, 1, 2, 3, 4, 5, 6, 7} or {8, 9, 10, 11, 12, 13, 14, 15}.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the base station 600 according to this embodiment may correspond to a base station that performs a method for transmitting a precoding matrix according to an embodiment, and the foregoing and other operations and/or functions of modules in the base station 600 are used to implement a corresponding procedure of the method in FIG. 4, which is not described herein any further for brevity.

Therefore, by means of the base station according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Figure 11:
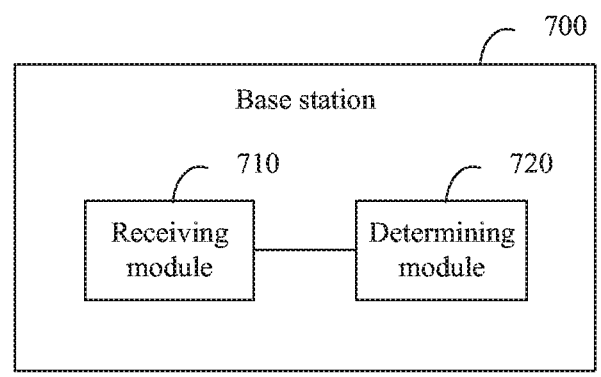
FIG. 11 is another schematic block diagram of a base station according to an embodiment.

FIG. 11 shows a schematic block diagram of a base station 700 according to an embodiment of the present invention. As shown in FIG. 11, the base station 700 includes a receiving module 710, configured to receive a jointly coded value sent by a user equipment. Also included is a determining module 720, configured to determine a value of a first codebook index and a rank used for indicating the number of transmission layers according to the jointly coded value received by the receiving module 710, a correspondence between the jointly coded value and the rank and a correspondence between the jointly coded value and the first codebook index, where: the value of the first codebook index corresponds to one precoding matrix set in a codebook set, the codebook set corresponds to the rank, precoding matrices included in the codebook set are represented by the first codebook index and a second codebook index, and the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6\}$, $\{1, 3, 5, 7\}$, $\{8, 10, 12, 14\}$, or $\{9, 11, 13, 15\}$.

Therefore, the base station according to this embodiment may prevent a problem where precoding matrices are repeated after subsampling, thereby improving system performance and enhancing user experience.

In this embodiment, optionally, a value range of the first codebook index $i_1$ is $0 \leq i_1 \leq 15$, and a value range of the second codebook index $i_2$ is $0 \leq i_2 \leq L_2 - 1$, where $L_2$ is a positive integer. For example, a value range of $L_2$ is $1 \leq L_2 \leq 16$, that is, the value range of the second codebook index $i_2$ is, for example, $0 \leq i_2 \leq 15$.

In this embodiment, optionally, when the rank determined by the determining module 720 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank determined by the determining module 720 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the number of bits bearing the jointly coded value is 4, the correspondence between the jointly coded value and the rank and the correspondence between the jointly coded value and the first codebook index are determined according to the following Table D:

TABLE D

| $I_{RI/PMI1}$ | RI | $i_1$ |
|---|---|---|
| 0-7 | 1 | $I_{RI/PMI1}$ |
| 8-15 | 2 | $I_{RI/PMI1} - 8$ | where $I_{RI/PMI1}$ represents the jointly coded value, RI represents the rank, and $i_1$ represents the first codebook index.

In this embodiment, optionally, when the number of bits bearing the jointly coded value is 3, the correspondence between the jointly coded value and the rank and the correspondence between the jointly coded value and the first codebook index are determined according to the following Table E:

TABLE E

| $I_{RI/PMI1}$ | RI | $i_1$ |
|---|---|---|
| 0-3 | 1 | $2 \times I_{RI/PMI1}$ |
| 4-7 | 2 | $2 \times (I_{RI/PMI1} - 4)$ | where $I_{RI/PMI1}$ represents the jointly coded value, RI represents the rank, and $i_1$ represents the first codebook index.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and a value range of the second codebook index corresponding to a second PMI have an association relationship. Optionally, that a value range of the first codebook index corresponding to the first PMI and a value range of the second codebook index corresponding to a second PMI have an association relationship includes: the value range of the second codebook index corresponding to the second PMI is uniquely determined according to a value and/or the value range of the first codebook index corresponding to the first PMI.

It should be understood that the base station 700 according to this embodiment may correspond to a base station that performs a method for transmitting a precoding matrix according to an embodiment of the present invention, and the foregoing and other operations and/or functions of modules in the base station 700 are used to implement a corresponding procedure of the method in FIG. 5, which is not described herein any further for brevity.

Therefore, the base station according to this embodiment may prevent a problem where precoding matrices are repeated after subsampling, thereby improving system performance and enhancing user experience.

Figure 12:
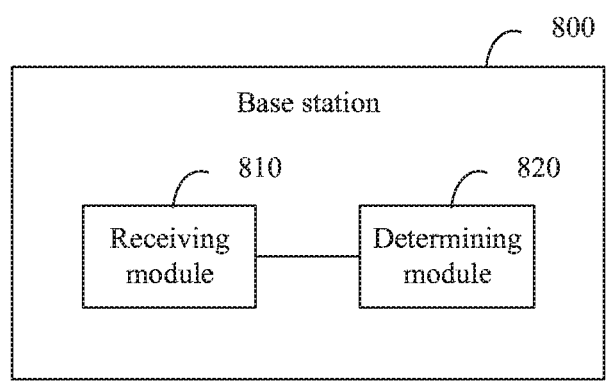
FIG. 12 is still another schematic block diagram of a base station according to an embodiment.

FIG. 12 shows a schematic block diagram of a base station 800 according to an embodiment of the present invention. As shown in FIG. 12, the base station 800 includes a receiving module 810, configured to receive a second precoding matrix indicator PMI, a first codebook index, and a rank used for indicating the number of transmission layers that are sent by a user equipment. Also included is a determining module 820, configured to determine, according to the second PMI and the first codebook index received by the receiving module 810, a first precoding matrix in a codebook set corresponding to the rank received by the receiving module 810, where precoding matrices included in the codebook set are represented by the first codebook index and a second codebook index, the second PMI and the second codebook index have a first correspondence, and for one given first codebook index, a value range of the second codebook index corresponding to a value range of the second PMI is a proper subset of a value range of the second codebook index, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$;

the first codebook index corresponds to one value of n, and a value range of n is a set $\{0, 1, 2, 3, 4, 5, 6, 7, 8, 9, 10, 11, 12, 13, 14, 15\}$; and when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and $a \in \{0, 1, 2, 3, 4, 5, 6, 7\}$.

Therefore, the base station according to this embodiment may prevent a problem where precoding matrices are repeated after subsampling, thereby improving system performance and enhancing user experience.

In this embodiment, optionally, when the rank received by the receiving module 810 is 1, $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

where $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; $e_i$ represents a column vector with a dimension of 4×1, where an $i^{th}$ element in $e_i$ is 1, all other elements are 0, and $i \in \{1, 2, 3, 4\}$; A is a constant.

In this embodiment, optionally, when the rank received by the receiving module 810 is 2, $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$; or $$W_2 \in \left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}$$

$(Y_1, Y_2) \in \{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

where $e_i$ represents a column vector with a dimension of 4×1, an $i^{th}$ element in $e_i$ is 1, all other elements are 0, and $i \in \{1, 2, 3, 4\}$; B is a constant.

In this embodiment, optionally, when the rank received by the receiving module 810 is 2, mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | where $I_{PMI2}$ represents the second PMI, $i_1$ represents the first codebook index, and $i_2$ represents the second codebook index.

In this embodiment, optionally, when the rank received by the receiving module 810 is 3 or 4, the precoding matrices included in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | where $W_n^{\{s\}}$ represents a matrix formed by a column set $\{s\}$ of a matrix $W_n = I - 2u_n u_n^H / u_n^H u_n$, and I is a 4×4 identity matrix.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and the value range of the second codebook index corresponding to the second PMI have an association relationship. Optionally, that a value range of the first codebook index corresponding to the first PMI and the value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the base station 800 according to this embodiment may correspond to a base station that performs a method for transmitting a precoding matrix according to an embodiment, and the foregoing and other operations and/or functions of modules in the base station 800 are used to implement a corresponding procedure of the method in FIG. 6, which is not described herein any further for brevity.

Therefore, the base station according to this embodiment may prevent a problem where precoding matrices are repeated after subsampling, thereby improving system performance and enhancing user experience.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

It should be understood that in this embodiment, "B corresponding to A" represents that B and A are associated and B may be determined according to A. However, it should be further understood that determining B according to A does not mean that B is determined only according to A and B may be further determined according to A and/or other information.

Figure 13:
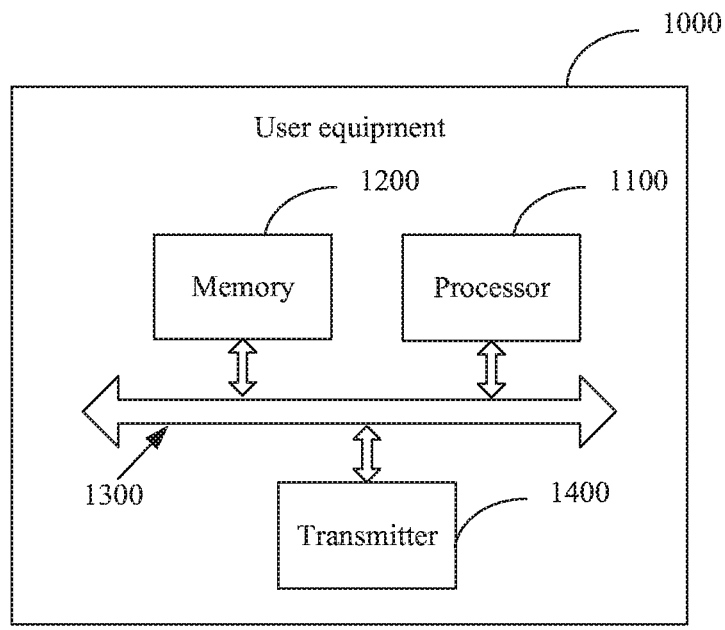
FIG. 13 is a schematic block diagram of a user equipment according to another embodiment.

As shown in FIG. 13, an embodiment further provides a user equipment 1000. The user equipment 1000 includes a processor 1100, a memory 1200, a bus system 1300, and a transmitter 1400. The processor 1100, the memory 1200, and the transmitter 1400 are connected by using the bus system 1300; the memory 1200 is configured to store an instruction, and the processor 1100 is configured to execute the instruction stored by the memory 1200, so as to control the transmitter 1400 to transmit a signal. The processor 1100 is configured to determine a rank used for indicating the number of transmission layers; determine a first precoding matrix in a codebook set corresponding to the rank, where precoding matrices included in the codebook set are represented by a first codebook index and a second codebook index; and determine a first precoding matrix indicator PMI and a second PMI used for indicating the first precoding matrix, where the first PMI and the first codebook index have a first correspondence, and the second PMI and the second codebook index have a second correspondence. The transmitter 1400 is configured to send the first PMI and the second PMI used for indicating the first precoding matrix to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

Therefore, by means of the user equipment according to this embodiment of the present invention, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

It should be understood that is this embodiment, the processor 1100 may be a central processing unit ("CPU" for short). The processor 1100 may also be another universal processor, a digital signal processor (DSP), an application-specific integrated circuit (ASIC), a field programmable gate array (FPGA), another programmable logic device, discrete gate, transistor logic device, or discrete hardware assembly, or the like. The universal processor may be a microprocessor, or the processor may also be any common processor or the like.

The memory 1200 may be a read-only memory or a random access memory and provides an instruction and data for the processor 1100. A part of the memory 1200 may further include a non-volatile random access memory. For example, the memory 1200 may further store information about device types, Besides a data bus, the bus system 1300 may further include a power supply bus, a control bus, a state signal bus, and the like. However, for the convenience of clear description, the various buses are illustrated as the bus system 1300 in the figure.

In an implementation process, the steps of the foregoing methods may be completed by using an integrated logic circuit of a hardware form or an instruction of a software form in the processor 1100. The steps with reference to the methods disclosed in the embodiments may be directly completed by a hardware processor, or be completed by a combination of hardware and software modules in the processor. The software module may be located in a mature storage medium in the art, such as a random access memory, a flash memory, a read-only memory, a programmable read-only memory, an electrically erasable programmable read-only memory, or a register. The storage medium is located on the memory 1200, and the processor 1100 completes the steps of the foregoing methods by reading information in the memory 1200 and by using hardware thereof, which is not described herein in detail to avoid repetition.

Optionally, as one embodiment, when the rank determined by the processor 1100 is 1, $W_2$ satisfies the equation (5).

Optionally, as one embodiment, when the rank determined by the processor 1100 is 2, $W_2$ satisfies the equation (6) or the equation (7).

Optionally, as one embodiment, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4)+1$, $\alpha(i) = q_1^{2(i-1)}$, and A is a constant.

Optionally, as one embodiment, when the rank determined by the processor 1100 is 1, the precoding matrices W included in the codebook set are determined according to Table A.

Optionally, as one embodiment, when the rank determined by the processor 1100 is 2, the precoding matrices W included in the codebook set are determined according to Table B1 or B2.

Optionally, as one embodiment, when the rank determined by the processor 1100 is 1, the first PMI, the second PMI, the first codebook index corresponding to the first PMI, and the second codebook index corresponding to the second PMI are determined according to Table C1, C2, C3, or C4.

Optionally, as one embodiment, when the rank determined by the processor 1100 is 2, the value range of n may be the set {0, 1, 2, 3, 4, 5, 6, 7} or {8, 9, 10, 11, 12, 13, 14, 15}.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the user equipment 1000 according to this embodiment may correspond to a user equipment that performs a method for transmitting a 4-antenna precoding matrix according to an embodiment, and the foregoing and other operations and/or functions of modules in the user equipment 1000 are used to implement a corresponding procedure of the method in FIG. 1, which is not described herein any further for brevity.

Therefore, by means of the user equipment according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Figure 14:
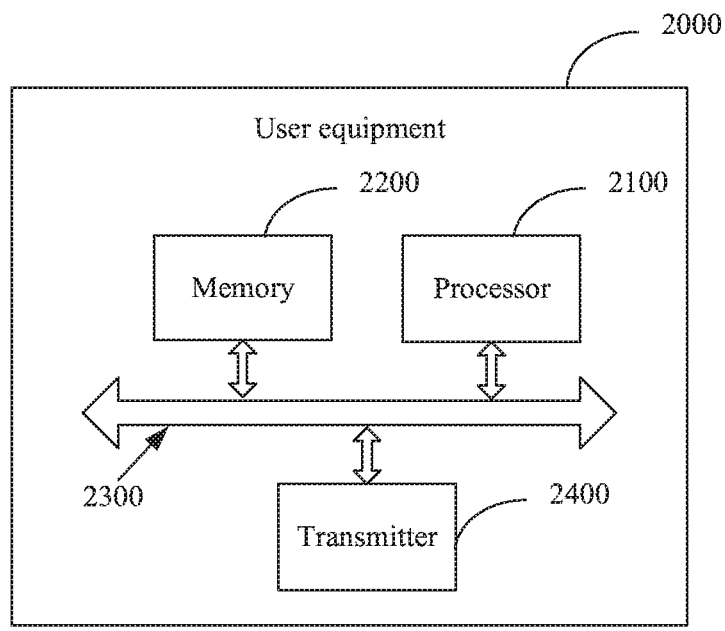
FIG. 14 is another schematic block diagram of a user equipment according to another embodiment.

As shown in FIG. 14, an embodiment further provides a user equipment 2000. The user equipment 2000 includes a processor 2100, a memory 2200, a bus system 2300, and a transmitter 2400. The processor 2100, the memory 2200, and the transmitter 2400 are connected by using the bus system 2300; the memory 2200 is configured to store an instruction, and the processor 2100 is configured to execute the instruction stored by the memory 2200, so as to control the transmitter 2400 to transmit a signal. The processor 2100 is configured to determine a rank used for indicating the number of transmission layers; determine a value of a first codebook index corresponding to one precoding matrix set in a codebook set, where the codebook set corresponds to the rank, and precoding matrices included in the codebook set are represented by the first codebook index and a second codebook index; and determine a jointly coded value corresponding to the rank and the value of the first codebook index, where the jointly coded value and the rank have a first correspondence, and the jointly coded value and the first codebook index have a second correspondence. The transmitter 2400 is configured to send the jointly coded value to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set {0, 1, 2, 3, 4, 5, 6, 7}, {8, 9, 10, 11, 12, 13, 14, 15}, {0, 2, 4, 6}, {1, 3, 5, 7}, {8, 10, 12, 14}, or {9, 11, 13, 15}.

Therefore, the user equipment according to this embodiment may prevent a problem where precoding matrices are repeated after subsampling, thereby improving system performance and enhancing user experience.

Optionally, as one embodiment, when the rank determined by the processor 2100 is 1, $W_2$ satisfies the equation (5).

Optionally, as one embodiment, when the rank determined by the processor 2100 is 2, $W_2$ satisfies the equation (6) or the equation (7).

Optionally, as one embodiment, when the number of bits bearing the jointly coded value is 4, the correspondence between the jointly coded value and the rank and the correspondence between the jointly coded value and the first codebook index are determined according to Table D.

Optionally, as one embodiment, when the number of bits bearing the jointly coded value is 3, the correspondence between the jointly coded value and the rank and the correspondence between the jointly coded value and the first codebook index are determined according to Table E.

It should be understood that in this embodiment, when the rank is determined to be 1, the precoding matrices W included in the codebook set are determined according to Table A; it should be further understood that in this embodiment of the present invention, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and a value range of the second codebook index corresponding to a second PMI have an association relationship. Optionally, that a value range of the first codebook index corresponding to the first PMI and a value range of the second codebook index corresponding to a second PMI have an association relationship includes: the value range of the second codebook index corresponding to the second PMI is uniquely determined according to a value and/or the value range of the first codebook index corresponding to the first PMI.

It should be understood that the user equipment 2000 according to this embodiment may correspond to a user equipment that performs a method for transmitting a 4-antenna precoding matrix according to an embodiment, and the foregoing and other operations and/or functions of modules in the user equipment 2000 are used to implement a corresponding procedure of the method in FIG. 2, which is not described herein any further for brevity.

Therefore, the user equipment according to this embodiment of the present invention may prevent a problem where precoding matrices are repeated after subsampling, thereby improving system performance and enhancing user experience.

Figure 15:
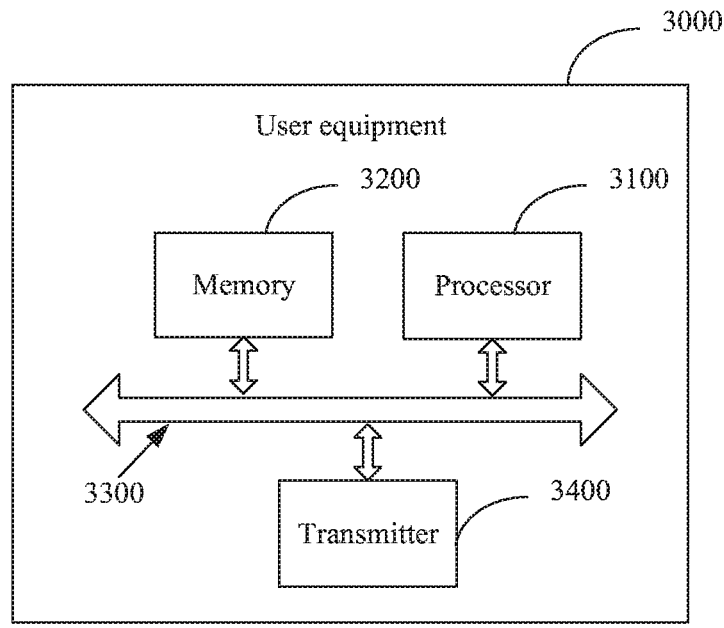
FIG. 15 is still another schematic block diagram of a user equipment according to another embodiment.

As shown in FIG. 15, an embodiment further provides a user equipment 3000. The user equipment 3000 includes a processor 3100, a memory 3200, a bus system 3300, and a transmitter 3400. The processor 3100, the memory 3200, and the transmitter 3400 are connected by using the bus system 3300; the memory 3200 is configured to store an instruction, and the processor 3100 is configured to execute the instruction stored by the memory 3200, so as to control the transmitter 3400 to transmit a signal. The processor 3100 is configured to determine a rank used for indicating the number of transmission layers; determine a first precoding matrix in a codebook set corresponding to the rank, where precoding matrices included in the codebook set are represented by a first codebook index and a second codebook index; and determine a second precoding matrix indicator PMI used for indicating the first precoding matrix, where the second PMI and the second codebook index have a first correspondence, and for one given first codebook index, a value range of the second codebook index corresponding to a value range of the second PMI is a proper subset of a value range of the second codebook index. The transmitter 1400 is configured to send the second PMI used for indicating the first precoding matrix to a base station, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15; and the first codebook index corresponds to one value of n, and a value range of n is a set {0, 1, 2, 3, 4, 5, 6, 7, 8, 9, 10, 11, 12, 13, 14, 15}; when the rank determined by the processor 3100 is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and a∈{0, 1, 2, 3, 4, 5, 6, 7}.

Therefore, the user equipment according to this embodiment of the present invention may prevent a problem where precoding matrices are repeated after subsampling, thereby improving system performance and enhancing user experience.

Optionally, as one embodiment, when the rank determined by the processor 3100 is 1, $W_2$ satisfies the equation (5).

Optionally, as one embodiment, when the rank determined by the processor 3100 is 2, $W_2$ satisfies the equation (6) or the equation (7).

Optionally, as one embodiment, when the rank determined by the processor 3100 is 2, mutual relationships between the second PMI, the first codebook index, and the second codebook index are determined according to Table F1 or F2.

Optionally, as one embodiment, when the rank determined by the processor 3100 is 3 or 4, the precoding matrices included in the codebook set corresponding to the rank are: four precoding matrices with codebook indexes 0 to 3 in Table G; four precoding matrices with codebook indexes 4 to 7 in Table G; or four precoding matrices with codebook indexes 12 to 15 in Table G.

It should be understood that in this embodiment, when the rank is determined to be 1, the precoding matrices W included in the codebook set are determined according to Table A; it should be further understood that in this embodiment of the present invention, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and the value range of the second codebook index corresponding to the second PMI have an association relationship. Optionally, that a value range of the first codebook index corresponding to the first PMI and the value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the user equipment 3000 according to this embodiment may correspond to a user equipment that performs a method for transmitting a 4-antenna precoding matrix according to an embodiment, and the foregoing and other operations and/or functions of modules in the user equipment 3000 are used to implement a corresponding procedure of the method in FIG. 3, which is not described herein any further for brevity.

Therefore, the user equipment according to this embodiment may prevent a problem where precoding matrices are repeated after subsampling, thereby improving system performance and enhancing user experience.

Figure 16:
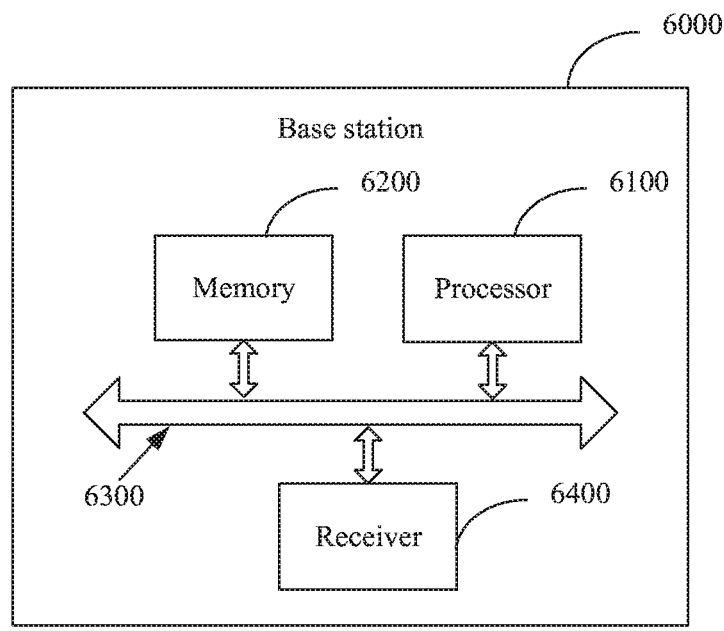
FIG. 16 is a schematic block diagram of a base station according to another embodiment.

As shown in FIG. 16, an embodiment further provides a base station 6000. The base station 6000 includes a processor 6100, a memory 6200, a bus system 6300, and a receiver 6400. The processor 6100, the memory 6200, and the receiver 6400 are connected by using the bus system 6300; the memory 6200 is configured to store an instruction, and the processor 6100 is configured to execute the instruction stored by the memory 6200, so as to control the receiver 6400 to receive a signal. The receiver 6400 is configured to receive a rank used for indicating the number of transmission layers, a first precoding matrix indicator PMI, and a second PMI that are sent by a user equipment; the processor 6100 is configured to determine a first precoding matrix in a codebook set corresponding to the rank according to the first PMI and the second PMI, where precoding matrices included in the codebook set are represented by a first codebook index and a second codebook index, the first PMI and the first codebook index have a first correspondence, and the second PMI and the second codebook index have a second correspondence, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6, 8, 10, 12, 14\}$, or $\{1, 3, 5, 7, 9, 11, 13, 15\}$.

Therefore, by means of the base station according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Optionally, as one embodiment, when the rank determined by the processor 6100 is 1, $W_2$ satisfies the equation (5).

Optionally, as one embodiment, when the rank determined by the processor 6100 is 2, $W_2$ satisfies the equation (6) or the equation (7).

Optionally, as one embodiment, a precoding matrix set corresponding to the first codebook index corresponding to the first PMI includes precoding matrices U1 and U2, where the precoding matrices U1 and U2 are indicated by the second codebook index, where:

$$U1 = \frac{1}{A}\begin{bmatrix} v \\ \beta v \end{bmatrix}, U2 = \frac{1}{A}\begin{bmatrix} v \\ -\beta v \end{bmatrix}, v = \begin{bmatrix} 1 \\ q_1^{n+(8n \bmod 32)} \end{bmatrix},$$

$\beta = j^{\lfloor n/4 \rfloor} * \alpha(i)$, $i = (n \bmod 4)+1$, $\alpha(i) = q_1^{2(i-1)}$, and A is a constant.

Optionally, as one embodiment, when the rank determined by the processor 6100 is 1, the precoding matrices W included in the codebook set are determined according to Table A.

Optionally, as one embodiment, when the rank determined by the processor 6100 is 2, the precoding matrices W included in the codebook set are determined according to Table B1 or B2.

Optionally, as one embodiment, when the rank determined by the processor 6100 is 1, the first PMI, the second PMI, the first codebook index corresponding to the first PMI, and the second codebook index corresponding to the second PMI are determined according to Table C1, C2, C3, or C4.

Optionally, as one embodiment, when the rank determined by the processor 6100 is 2, the value range of n may be the set $\{0, 1, 2, 3, 4, 5, 6, 7\}$ or $\{8, 9, 10, 11, 12, 13, 14, 15\}$.

In this embodiment, optionally, a value range of the first codebook index corresponding to the first PMI and a value range of the second codebook index corresponding to the second PMI have an association relationship. Optionally, that a value range of the first codebook index corresponding to the first PMI and a value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the base station 6000 according to this embodiment may correspond to a base station that performs a method for transmitting a 4-antenna precoding matrix according to an embodiment, and the foregoing and other operations and/or functions of modules in the base station 6000 are used to implement a corresponding procedure of the method in FIG. 4, which is not described herein any further for brevity.

Therefore, by means of the base station according to this embodiment, more precoding matrices that are applicable to a uniform linear array antenna may be indicated without changing a feedback mode or feedback bits, and it may also be ensured that performance for application of a dual-polarized antenna is not affected, so that system performance may be improved and user experience may be enhanced.

Figure 17:
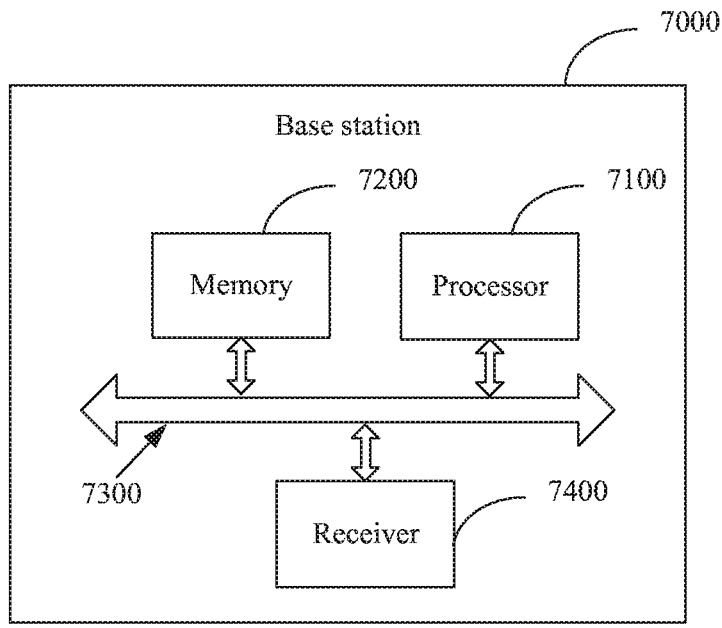
FIG. 17 is another schematic block diagram of a base station according to another embodiment.

As shown in FIG. 17, an embodiment further provides a base station 7000. The base station 7000 includes a processor 7100, a memory 7200, a bus system 7300, and a receiver 7400. The processor 7100, the memory 7200, and the receiver 7400 are connected by using the bus system 7300; the memory 7200 is configured to store an instruction, and the processor 7100 is configured to execute the instruction stored by the memory 7200, so as to control the receiver 7400 to receive a signal. The receiver 7400 is configured to receive a jointly coded value sent by a user equipment; the processor 7100 is configured to determine a value of a first codebook index and a rank used for indicating the number of transmission layers according to the jointly coded value, a correspondence between the jointly coded value and the rank and a correspondence between the jointly coded value and the first codebook index, where the value of the first codebook index corresponds to one precoding matrix set in a codebook set, the codebook set corresponds to the rank, precoding matrices included in the codebook set are represented by the first codebook index and a second codebook index, and the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15; and the first codebook index corresponds to one value of n, and a value range of n is a set $\{0, 1, 2, 3, 4, 5, 6, 7\}$, $\{8, 9, 10, 11, 12, 13, 14, 15\}$, $\{0, 2, 4, 6\}$, $\{1, 3, 5, 7\}$, $\{8, 10, 12, 14\}$, or $\{9, 11, 13, 15\}$.

Therefore, the base station according to this embodiment may prevent a problem where precoding matrices are repeated after subsampling, thereby improving system performance and enhancing user experience.

Optionally, as one embodiment, when the rank determined by the processor 7100 is 1, $W_2$ satisfies the equation (5).

Optionally, as one embodiment, when the rank determined by the processor 7100 is 2, $W_2$ satisfies the equation (6) or the equation (7).

Optionally, as one embodiment, when the number of bits bearing the jointly coded value is 4, the correspondence between the jointly coded value and the rank and the correspondence between the jointly coded value and the first codebook index are determined according to Table D.

Optionally, as one embodiment, when the number of bits bearing the jointly coded value is 3, the correspondence between the jointly coded value and the rank and the correspondence between the jointly coded value and the first codebook index are determined according to Table E.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment, the jointly coded value represents a value generated by performing joint coding on the rank and a first PMI, which is not described herein any further for brevity.

In this embodiment, optionally, a value range of the first codebook index corresponding to the first PMI and a value range of the second codebook index corresponding to a second PMI have an association relationship. Optionally, that a value range of the first codebook index corresponding to the first PMI and a value range of the second codebook index corresponding to a second PMI have an association relationship includes: the value range of the second codebook index corresponding to the second PMI is uniquely determined according to the value and/or the value range of the first codebook index corresponding to the first PMI.

It should be understood that the base station 7000 according to this embodiment may correspond to the base station that performs a method for transmitting a 4-antenna precoding matrix according to an embodiment, and the foregoing and other operations and/or functions of modules in the base station 7000 are used to implement a corresponding procedure of the method in FIG. 5, which is not described herein any further for brevity.

Therefore, the base station according to this embodiment may prevent a problem where precoding matrices are repeated after subsampling, thereby improving system performance and enhancing user experience.

Figure 18:
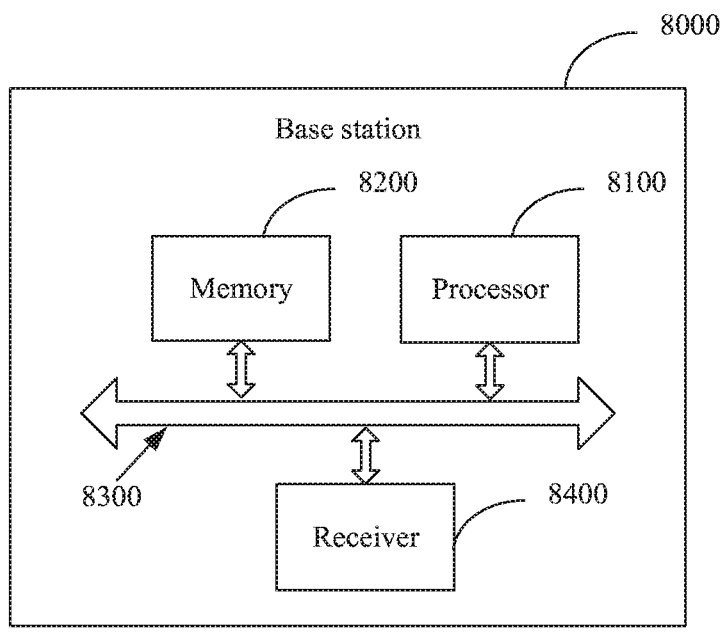
FIG. 18 is still another schematic block diagram of a base station according to another embodiment.

As shown in FIG. 18, an embodiment further provides a base station 8000. The base station 8000 includes a processor 8100, a memory 8200, a bus system 8300, and a receiver 8400. The processor 8100, the memory 8200, and the receiver 8400 are connected by using the bus system 8300; the memory 8200 is configured to store an instruction, and the processor 8100 is configured to execute the instruction stored by the memory 8200, so as to control the receiver 8400 to receive a signal. The receiver 8400 is configured to receive a second precoding matrix indicator PMI, a first codebook index, and a rank used for indicating the number of transmission layers that are sent by a user equipment; the processor 8100 is configured to determine a first precoding matrix in a codebook set corresponding to the rank according to the second PMI and the first codebook index, where precoding are included in the codebook set are represented by the first codebook index and a second codebook index, the second PMI and the second codebook index have a first correspondence, and for one given first codebook index, a value range of the second codebook index corresponding to a value range of the second PMI is a proper subset of a value range of the second codebook index, where the precoding matrices W included in the codebook set satisfy the following equation:

$W = W_1 \times W_2$, where $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, . . . , 15;

the first codebook index corresponds to one value of n, and a value range of n is a set $\{0, 1, 2, 3, 4, 5, 6, 7, 8, 9, 10, 11, 12, 13, 14, 15\}$; and when the rank received by the receiver 8400 is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, where the first codebook index $i_{1,a}$ represents a first codebook index corresponding to n whose value is a, the first codebook index $i_{1,a+8}$ represents a first codebook index corresponding to n whose value is a+8, and a∈$\{0, 1, 2, 3, 4, 5, 6, 7\}$.

Therefore, the base station according to this embodiment may prevent a problem where precoding matrices are repeated after subsampling, thereby improving system performance and enhancing user experience.

Optionally, as one embodiment, when the rank determined by the processor 8100 is 1, $W_2$ satisfies the equation (5).

Optionally, as one embodiment, when the rank determined by the processor 8100 is 2, $W_2$ satisfies the equation (6) or the equation (7).

Optionally, as one embodiment, when the rank determined by the processor 8100 is 2, mutual relationships between the second PMI, the first codebook index, and the second codebook index are determined according to Table F1 or F2.

Optionally, as one embodiment, when the rank determined by the processor 8100 is 3 or 4, the precoding matrices included in the codebook set corresponding to the rank are: four precoding matrices with codebook indexes 0 to 3 in Table G; four precoding matrices with codebook indexes 4 to 7 in Table G; or four precoding matrices with codebook indexes 12 to 15 in Table G.

It should be understood that in this embodiment, when the rank is determined to be 1, the precoding matrices W included in the codebook set are determined according to Table A; it should be further understood that in this embodiment, when the rank determined by the UE is 2, the precoding matrices W included in the codebook set are determined according to Table B1 or B2. It should be understood that in this embodiment of the present invention, the jointly coded value represents a value generated by performing joint coding on the rank and a first PMI, which is not described herein any further for brevity.

In this embodiment, optionally, a value range of the first codebook index corresponding to the first PMI and the value range of the second codebook index corresponding to the second PMI have an association relationship. Optionally, that a value range of the first codebook index corresponding to the first PMI and the value range of the second codebook index corresponding to the second PMI have an association relationship includes: the value range of the second codebook index corresponding to the second PMI is uniquely determined according to a value and/or the value range of the first codebook index corresponding to the first PMI.

It should be understood that the base station 8000 according to this embodiment may correspond to a base station that performs a method for transmitting a 4-antenna precoding matrix according to an embodiment, and the foregoing and other operations and/or functions of modules in the base station 8000 are used to implement a corresponding procedure of the method in FIG. 6, which is not described herein any further for brevity.

Therefore, the base station according to this embodiment may prevent a problem where precoding matrices are repeated after subsampling, thereby improving system performance and enhancing user experience.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining a rank used for indicating a number of transmission layers;
   determining a first precoding matrix in a codebook set corresponding to the rank, wherein precoding matrices comprised in the codebook set are represented by a first codebook index and a second codebook index;
   determining a second precoding matrix indicator (PMI) for indicating the first precoding matrix, wherein the second PMI and the second codebook index have a first correspondence, and for a given first codebook index, a value range of the second codebook index corresponding to a value range of the second PMI is a proper subset of a value range of the second codebook index; and
   sending the second PMI used for indicating the first precoding matrix to a base station, wherein:
   the precoding matrices (W) comprised in the codebook set satisfy the following equation:
   W=W$_1$×W$_2$, wherein $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15;
   wherein the first codebook index corresponds to one value of n, and a value range of n is a set {0, 1, 2, 3, 4, 5, 6, 7, 8, 9, 10, 11, 12, 13, 14, 15}; and
   wherein when the rank is determined to be 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, wherein the first codebook index $i_{1,a}$ represents a first codebook index corresponding to n whose value is a, the first codebook index $i_{1,a+8}$ represents a first codebook index corresponding to n whose value is a+8, and a∈{0, 1, 2, 3, 4, 5, 6, 7}.

2. The method according to claim 1, wherein when the rank is determined to be 1, W$_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

wherein Y∈{$e_1,e_2,e_3,e_4$}, $\alpha(i)=q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; wherein $e_i$ represents a column vector with a dimension of 4×1, wherein an $i^{th}$ element in $e_i$ is 1, all other elements are 0, and i∈{1, 2, 3, 4}; and wherein A is a constant.

3. The method according to claim 2, wherein when the rank is determined to be 2, W$_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in$
{$(e_1, e_1), (e_2, e_2), (e_3, e_3), (e_4, e_4), (e_1, e_2), (e_2, e_3), (e_1, e_4), (e_2, e_4)$};

or $W_2 \in$ $$\left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\}(Y_1, Y_2) \in$$

{$(e_2, e_4)$}

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}(Y_1, Y_2) \in$$

{$(e_1, e_1), (e_2, e_2), (e_3, e_3), (e_4, e_4)$}

$$W_2 \in \left\{ \frac{1}{B}\begin{bmatrix} Y_1 & Y_2 \\ Y_2 & -Y_1 \end{bmatrix} \right\}(Y_1, Y_2) \in \{(e_1, e_3), (e_2, e_4), (e_3, e_1), (e_4, e_2)\}$$

wherein $e_i$ represents a column vector with a dimension of 4×1, an $i^{th}$ element in $e_i$ is 1, all other elements are 0, and i∈{1, 2, 3, 4}; and wherein B is a constant.

4. The method according to claim 3, wherein when the rank is determined to be 2, mutual relationships between the second PMI, the first codebook index, and the second codebook index are determined according to Table F1 or F2:

TABLE F1

| $I_{PMI2}$ | $i_1$ | $i_2$ |
| --- | --- | --- |
| 0-3 | 0-7 | 2 × $I_{PMI2}$ |
|  | 8-15 | 2 × $I_{PMI2}$ + 1 |

TABLE F2

| $I_{PMI2}$ | $i_1$ | $i_2$ |
| --- | --- | --- |
| 0-3 | 0-7 | 2 × $I_{PMI2}$ |
|  | 8-15 | 2 × $I_{PMI2}$ + 8 | wherein $I_{PMI2}$ represents the second PMI, $i_1$ represents the first codebook index, and $i_2$ represents the second codebook index.

5. The method according to claim 1, wherein when the rank is determined to be 3 or 4, the precoding matrices comprised in the codebook set corresponding to the rank are:
   four precoding matrices with codebook indexes 0 to 3 in Table G; or
   four precoding matrices with codebook indexes 4 to 7 in Table G; or
   four precoding matrices with codebook indexes 12 to 15 in Table G,

TABLE G

| Codebook Index | $u_n$ | RI | | | |
| --- | --- | --- | --- | --- | --- |
|  |  | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |

TABLE G-continued

| Codebook Index | $u_n$ | RI 1 | 2 | 3 | 4 |
|---|---|---|---|---|---|
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{14\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | wherein $W_n^{\{s\}}$ represents a matrix formed by a column set {s} of a matrix $W_n = I - 2u_n u_n^H / u_n^H u_n$, and I is a 4×4 identity matrix.

6. A method, comprising:

receiving a second precoding matrix indicator PMI, a first codebook index, and a rank used for indicating a number of transmission layers that are sent by a user equipment; and determining a first precoding matrix in a codebook set corresponding to the rank according to the second PMI and the first codebook index, wherein precoding matrices comprised in the codebook set are represented by the first codebook index and a second codebook index, the second PMI and the second codebook index have a first correspondence, and for a given first codebook index, a value range of the second codebook index corresponding to a value range of the second PMI is a proper subset of a value range of the second codebook index;

wherein the precoding matrices W comprised in the codebook set satisfy the following equation:

$W = W_1 \times W_2$, wherein $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and $n = 0, 1, \ldots, 15$;

wherein the first codebook index corresponds to one value of n, and a value range of n is a set {0, 1, 2, 3, 4, 5, 6, 7, 8, 9, 10, 11, 12, 13, 14, 15}; and wherein when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, wherein the first codebook index $i_{1,a}$ represents a first codebook index corresponding to n whose value is a, and the first codebook index $i_{1,a+8}$ represents a first codebook index corresponding to n whose value is a+8, and $a \in \{0, 1, 2, 3, 4, 5, 6, 7\}$.

7. The method according to claim 6, wherein the received rank is 1, and $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

wherein $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; wherein $e_i$ represents a column vector with a dimension of 4×1, wherein an $i^{th}$ element in $e_i$ is 1, all other elements are 0, and $i \in \{1, 2, 3, 4\}$; and wherein A is a constant.

8. The method according to claim 7, wherein the received rank is 2, and $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in$ $\{(e_1, e_1), (e_2, e_2), (e_3, e_3), (e_4, e_4), (e_1, e_2), (e_2, e_3), (e_1, e_4), (e_2, e_4)\};$ or $W_2 \in$ $$\left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\} (Y_1, Y_2) \in$$

$\{(e_2, e_4)\}$ $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$$

$\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$$

wherein $e_i$ represents a column vector with a dimension of 4×1, an $i^{th}$ element in $e_i$ is 1, all other elements are 0, and $i \in \{1, 2, 3, 4\}$; B is a constant.

9. The method according to claim 8, wherein mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | wherein $I_{PMI2}$ represents the second PMI, $i_1$ represents the first codebook index, and $i_2$ represents the second codebook index.

10. The method according to claim 6, wherein the received rank is 3 or 4, and the precoding matrices comprised in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | wherein $W_n^{\{s\}}$ represents a matrix formed by a column set $\{s\}$ of a matrix $W_n = I - 2u_n u_n^H / u_n^H u_n$, and I is a 4×4 identity matrix.

11. A user equipment, comprising:

a processor, configured to:

determine a rank used for indicating a number of transmission layers;

determine a first precoding matrix in a codebook set corresponding to the rank, wherein precoding matrices comprised in the codebook set are represented by a first codebook index and a second codebook index;

determine a second precoding matrix indicator (PMI) for indicating the first precoding matrix, wherein the second PMI and the second codebook index have a first correspondence, and for a given first codebook index, a value range of the second codebook index corresponding to a value range of the second PMI is a proper subset of a value range of the second codebook index; and a transmitter, configured to send, to a base station, the second PMI for indicating the first precoding matrix;

wherein the precoding matrices W comprised in the codebook set satisfy the following equation:

$W = W_1 \times W_2$, wherein $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15;

wherein the first codebook index corresponds to one value of n, and a value range of n is a set $\{0, 1, 2, 3, 4, 5, 6, 7, 8, 9, 10, 11, 12, 13, 14, 15\}$; and wherein when the rank determined by the processor is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, wherein the first codebook index $i_{1,a}$ represents a first codebook index corresponding to n whose value is a, the first codebook index $i_{1,a+8}$ represents a first codebook index corresponding to n whose value is a+8, and a∈$\{0, 1, 2, 3, 4, 5, 6, 7\}$.

12. The user equipment according to claim 11, wherein the rank determined by the processor is 1, and $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

wherein $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; wherein $e_i$ represents a column vector with a dimension of 4×1, wherein an $i^{th}$ element in $e_i$ is 1, all other elements are 0, and i∈$\{1, 2, 3, 4\}$; and wherein A is a constant.

13. The user equipment according to claim 11, wherein the rank determined by the processor is 2, and $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

-continued $(Y_1, Y_2) \in$ $\{(e_1, e_1), (e_2, e_2), (e_3, e_3), (e_4, e_4), (e_1, e_2), (e_2, e_3), (e_1, e_4), (e_2, e_4)\};$ or $W_2 \in$ $\left\{ \dfrac{1}{B}\begin{bmatrix} Y_1 & Y_2 \\ Y_1 & Y_2 \end{bmatrix}, \dfrac{1}{B}\begin{bmatrix} Y_1 & Y_2 \\ Y_1 & -Y_2 \end{bmatrix}, \dfrac{1}{B}\begin{bmatrix} Y_1 & Y_2 \\ -Y_1 & Y_2 \end{bmatrix}, \dfrac{1}{B}\begin{bmatrix} Y_1 & Y_2 \\ -Y_1 & -Y_2 \end{bmatrix} \right\}(Y_1, Y_2) \in$ $\{(e_2, e_4)\}$ $W_2 \in \left\{ \dfrac{1}{B}\begin{bmatrix} Y_1 & Y_2 \\ Y_1 & -Y_2 \end{bmatrix}, \dfrac{1}{B}\begin{bmatrix} Y_1 & Y_2 \\ jY_1 & -jY_2 \end{bmatrix} \right\}(Y_1, Y_2) \in$ $\{(e_1, e_1), (e_2, e_2), (e_3, e_3), (e_4, e_4)\}$ -continued $W_2 \in \left\{ \dfrac{1}{B}\begin{bmatrix} Y_1 & Y_2 \\ Y_2 & -Y_1 \end{bmatrix} \right\}, (Y_1, Y_2) \in \{(e_1, e_3), (e_2, e_4), (e_3, e_1), (e_4, e_2)\}$ wherein $e_i$ represents a column vector with a dimension of 4×1, an $i^{th}$ element in $e_i$ is 1, all other elements are 0, and $i \in \{1, 2, 3, 4\}$; and wherein B is a constant.

14. The user equipment according to claim 13, wherein the rank determined by the processor is 2, and mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
|  | 8-15 | $2 \times I_{PMI2} + 8$ | wherein $I_{PMI2}$ represents the second PMI, $i_1$ represents the first codebook index, and $i_2$ represents the second codebook index.

15. The user equipment according to claim 11, wherein the rank determined by the processor is 3 or 4, and the precoding matrices comprised in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G;

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | wherein $W_n^{\{s\}}$ represents a matrix formed by a column set $\{s\}$ of a matrix $W_n = I - 2u_n u_n^H / u_n^H u_n$, and I is a 4×4 identity matrix.

16. A base station, comprising:

a receiver, configured to receive a second precoding matrix indicator (PMI), a first codebook index, and a rank used for indicating the number of transmission layers that are sent by a user equipment;

a processor, configured to determine, according to the second PMI and the first codebook index received by the receiver, a first precoding matrix in a codebook set corresponding to the rank received by the receiver, wherein precoding matrices comprised in the codebook set are represented by the first codebook index and a second codebook index, the second PMI and the second codebook index have a first correspondence, and for a given first codebook index, a value range of the second codebook index corresponding to a value range of the second PMI is a proper subset of a value range of the second codebook index;

wherein the precoding matrices (W) comprised in the codebook set satisfy the following equation:

$W = W_1 \times W_2$, wherein $$W_1 = \begin{bmatrix} X_n & 0 \\ 0 & X_n \end{bmatrix}, X_n = \begin{bmatrix} 1 & 1 & 1 & 1 \\ q_1^n & q_1^{n+8} & q_1^{n+16} & q_1^{n+24} \end{bmatrix},$$

$q_1 = e^{j2\pi/32}$, and n=0, 1, ..., 15;

wherein the first codebook index corresponds to one value of n, and a value range of n is a set {0, 1, 2, 3, 4, 5, 6, 7, 8, 9, 10, 11, 12, 13, 14, 15}; and wherein when the received rank is 2, in precoding matrix sets that are determined according to the first codebook index and the second codebook index corresponding to the value range of the second PMI, a first precoding matrix set corresponding to a first codebook index $i_{1,a}$ and a second precoding matrix set corresponding to a first codebook index $i_{1,a+8}$ are mutually exclusive, wherein the first codebook index $i_{1,a}$ represents a first codebook index corresponding to n whose value is a, the first codebook index $i_{1,a+8}$ represents a first codebook index corresponding to n whose value is a+8, and a∈{0, 1, 2, 3, 4, 5, 6, 7}.

17. The base station according to claim 16, wherein the rank received by the receiver is 1, and $W_2$ satisfies the following equation:

$$W_2 \in \left\{ \frac{1}{A}\begin{bmatrix} Y \\ \alpha(i)Y \end{bmatrix}, \frac{1}{A}\begin{bmatrix} Y \\ j\alpha(i)Y \end{bmatrix}, \frac{1}{A}\begin{bmatrix} Y \\ -\alpha(i)Y \end{bmatrix}, \frac{1}{A}\begin{bmatrix} Y \\ -j\alpha(i)Y \end{bmatrix} \right\},$$

wherein $Y \in \{e_1, e_2, e_3, e_4\}$, $\alpha(i) = q_1^{2(i-1)}$; when Y is $e_1$, $\alpha(i)$ is $\alpha(1)$; when Y is $e_2$, $\alpha(i)$ is $\alpha(2)$; when Y is $e_3$, $\alpha(i)$ is $\alpha(3)$; when Y is $e_4$, $\alpha(i)$ is $\alpha(4)$; wherein $e_i$ represents a column vector with a dimension of 4×1, wherein an $i^{th}$ element in $e_i$ is 1, all other elements are 0, and $i \in \{1, 2, 3, 4\}$; and wherein A is a constant.

18. The base station according to claim 16, wherein the rank received by the receiver is 2, and $W_2$ satisfies the following equation:

$$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\}$$

$(Y_1, Y_2) \in$ $\{(e_1, e_1), (e_2, e_2), (e_3, e_3), (e_4, e_4), (e_1, e_2), (e_2, e_3), (e_1, e_4), (e_2, e_4)\}$;

or $W_2 \in$ $\left\{ \frac{1}{B}\begin{bmatrix} Y_1 & Y_2 \\ Y_1 & Y_2 \end{bmatrix}, \frac{1}{B}\begin{bmatrix} Y_1 & Y_2 \\ Y_1 & -Y_2 \end{bmatrix}, \frac{1}{B}\begin{bmatrix} Y_1 & Y_2 \\ -Y_1 & Y_2 \end{bmatrix}, \frac{1}{B}\begin{bmatrix} Y_1 & Y_2 \\ -Y_1 & -Y_2 \end{bmatrix} \right\} (Y_1, Y_2) \in$ $\{(e_2, e_4)\}$ -continued $$W_2 \in \left\{ \frac{1}{B}\begin{bmatrix} Y_1 & Y_2 \\ Y_1 & -Y_2 \end{bmatrix}, \frac{1}{B}\begin{bmatrix} Y_1 & Y_2 \\ jY_1 & -jY_2 \end{bmatrix} \right\} (Y_1, Y_2) \in$ $\{(e_1, e_1), (e_2, e_2), (e_3, e_3), (e_4, e_4)\}$ $$W_2 \in \left\{ \frac{1}{B}\begin{bmatrix} Y_1 & Y_2 \\ Y_2 & -Y_1 \end{bmatrix} \right\} (Y_1, Y_2) \in \{(e_1, e_3), (e_2, e_4), (e_3, e_1), (e_4, e_2)\}$ wherein $e_i$ represents a column vector with a dimension of 4×1, an $i^{th}$ element in $e_i$ is 1, all other elements are 0, and $i \in \{1, 2, 3, 4\}$; and wherein B is a constant.

19. The base station according to claim 18, wherein the rank received by the receiver is 2, and mutual relationships between the second PMI, the first codebook index, and the second codebook index are determined according to Table F1 or F2:

TABLE F1

| $I_{PMI2}$ | $i_1$ | $i_2$ |
|---|---|---|
| 0-3 | 0-7 | $2 \times I_{PMI2}$ |
| | 8-15 | $2 \times I_{PMI2} + 1$ |

TABLE F2

| $I_{PMI2}$ | $i_1$ | $i_2$ |
|---|---|---|
| 0-3 | 0-7 | $2 \times I_{PMI2}$ |
| | 8-15 | $2 \times I_{PMI2} + 8$ | wherein $I_{PMI2}$ represents the second PMI, $i_1$ represents the first codebook index, and $i_2$ represents the second codebook index.

20. The base station according to claim 16, wherein the rank received by the receiver is 3 or 4, the precoding matrices comprised in the codebook set corresponding to the rank are:

four precoding matrices with codebook indexes 0 to 3 in Table G; or four precoding matrices with codebook indexes 4 to 7 in Table G; or four precoding matrices with codebook indexes 12 to 15 in Table G,

TABLE G

| Codebook Index | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |

TABLE G-continued

| Codebook | | RI | | | |
| --- | --- | --- | --- | --- | --- |
| Index | $u_n$ | 1 | 2 | 3 | 4 |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | wherein $W_n^{\{s\}}$ represents a matrix formed by a column set $\{s\}$ of a matrix $W_n = I - 2u_n u_n^H / u_n^H u_n$, and I is a 4×4 identity matrix.

\* \* \* \* \*